United States Patent [19]

Itoh et al.

[11] Patent Number: 5,616,681
[45] Date of Patent: Apr. 1, 1997

[54] PROCESS FOR PRODUCING ALIPHATIC POLYESTER

[75] Inventors: Hiroshi Itoh, Kobe; Yoshinobu Yamamoto, Suita; Koji Fukuhara; Masahiro Shiroshima, both of Osaka; Hiroya Kobayashi, Minoo, all of Japan

[73] Assignee: Nippon Shokubai Co., Ltd., Osaka, Japan

[21] Appl. No.: 550,964

[22] Filed: Oct. 31, 1995

[30] Foreign Application Priority Data

| Nov. 1, 1994 | [JP] | Japan | 6-269095 |
| Nov. 1, 1994 | [JP] | Japan | 6-269096 |
| Mar. 29, 1995 | [JP] | Japan | 7-71559 |

[51] Int. Cl.$^6$ ........................ C08G 63/85
[52] U.S. Cl. ........................ 528/279; 528/272; 528/297; 528/361; 528/503; 524/783
[58] Field of Search ........................ 528/272, 279, 528/297, 361, 503; 524/783

[56] References Cited

U.S. PATENT DOCUMENTS

| 3,883,901 | 5/1975 | Coquard et al. . | |
| 5,391,700 | 2/1995 | Itoh et al. ................ | 528/297 |

FOREIGN PATENT DOCUMENTS

| 0486437A | 5/1992 | European Pat. Off. . |
| 0622390A | 11/1994 | European Pat. Off. . |
| 1416402A | 1/1966 | France . |
| 42-26708 | 12/1967 | Japan . |
| 5-310898 | 11/1993 | Japan . |
| 6-271656 | 9/1994 | Japan . |
| 6-322081 | 11/1994 | Japan . |
| 6-336519 | 12/1994 | Japan . |

*Primary Examiner*—Samuel A. Acquah
*Attorney, Agent, or Firm*—Ronald J. Kubovcik; James C. Lydon

[57] ABSTRACT

A method for producing an aliphatic polyester having a biodegradability and a higher melting point than conventional aliphatic polyester by suppressing a volatile component generated by side reaction or decomposition reaction with industrially good efficiency and economically in a relatively short period of time, the method enabling a polymerization at vacuum which permits a use of general vacuum pump. The aliphatic polyester can be obtained, for example, by a ring-opening copolymerization of a cyclic acid anhydride with a cyclic ether in a presence of a zirconium compound. The aliphatic polyester also can be obtained by performing a polymerization of raw materials of the aliphatic polyester so as to have a degree of viscosity in the range of 10–10,000 poise when 0.1–30 hours elapsed after the reaction started at reaction temperature of the reaction system under conditions of reaction temperature in the range of 180° C. to 280° C. and reaction pressure in the range of 0.3 mmHg to 3.0 mmHg.

79 Claims, No Drawings

PROCESS FOR PRODUCING ALIPHATIC POLYESTER

FIELD OF THE INVENTION

The present invention relates to a process for producing an aliphatic polyester, and more particularly, to a process for producing an aliphatic polyester which has biodegradability and is readily processed with molding into fibers, molded articles, sheens, films or the like.

BACKGROUND OF THE INVENTION

A polyester, which includes an aromatic polyester and an aliphatic polyester, is used in a variety of fields for different purposes. The aromatic polyester is mainly used as materials for films, molded articles, and the like. Copolymers of the aromatic polyester with the aliphatic polyester is used as an adhesion agent, a coating material, and the like, and block copolymers are used as a thermoplastic elastomer to produce various kinds of molded articles.

In general, the aliphatic polyester is mainly used as raw materials of a polyurethane, a plasticizer for polyvinyl chloride, medical materials, and the like. Since the aliphatic polyester is characterized by having biodegradability, the aliphatic polyester is expected to be used as fibers, molded articles, sheets, films, and the like by combining one or more kinds of additives as occasion demands.

Conventionally, the aliphatic polyester is produced by a process comprising esterifying directly an aliphatic dicarboxylic acid and an aliphatic glycol, or performing a transesterification reaction between an alkyl ester of an aliphatic dicarboxylic acid and an aliphatic glycol to synthesize a glycol ester and/or a prepolymer thereof and then heating the resulting compound with stirring under a pressure in a range between 0.4 mmHg and 1 mmHg, i.e., high vacuum, for a long perted of time to perform a polycondensation reaction. Note that water is produced as the esterifying reaction proceeds while a glycol is produced as the transesterification reaction proceeds.

However, the aliphatic polyester produced by the above processes has a number-average molecular weight of less than 20,000. In addition, Japanese Official Patent Gazette No. Heisei 5-310898 discloses a process of producing an aliphatic polyester, which comprises performing a deglycol reaction (transestertfication reaction) of an aliphatic dicarboxylic acid and an aliphatic glycol using a catalyst under conditions of a temperature in a range between 180° C. and 230° C., and a pressure in a range between 0.05 mmHg and 0.1 mmHg. Also, Japanese Official Patent Gazette No. Heisei 6-322081 discloses a process of producing an aliphatlc polyester whose number-average molecular weight (Mn) is not less than 5,000, which comprises performing a reaction of an aliphatic dicarboxylic acid and an aliphatic glycol using a catalyst under conditions of a temperatures of 240° C., a pressure of not more than 1 mmHg, and preferably not more than 0.5 mmHg.

However, the above process, in which a polycondensation reaction is performed while heating the aliphatic dicarboxylic acid and aliphatic glycol using catalyst with stirring under high vacuum for a long period of time, readily causes a side reaction and a decomposition reaction of the aliphatic polyester. In other words, the above process produces an abundance of volatile components, that is, by-products produced by the side reaction and low molecular weight compounds such as decomposed components (oligomer) produced by the decomposition reaction. Since the volatile components thus produced have substantially no utility value, the above process can not produce an inexpensive aliphatic polyester.

Further, such an abundance of volatile components readily causes a clog between a reactor (reacting vessel) and a trap. Thus, the reaction must be suspended frequently to remove the volatile components. Moreover, when the volatile components can not be collected completely at the trap, a great amount of the volatile components flows into a vacuum pump. This not only causes a vacuum down (a rise in pressure), but also degrades the performance of the vacuum pump and causes failures or the like. Thus, the above process has a problem that the reaction takes an extremely long period of time and an aliphatic polyester having a predetermined molecular weight can not be produced. In addition, the above process which is carried out under high vacuum demands a high-performance vacuum pump. However, such a high-performance vacuum pump is expensive, and the volatile components easily flows into the same, thereby requiring a considerable effort to maintain the performance thereof. Thus, the above-mentioned conventional process has low industrial feasibility. To eliminate this problem, there is an increasing need for a process capable of producing an aliphatic polyester in industrially efficient manner using a general vacuum pump used for producing a saturated polyester, such as polyethylene terephthalate (PET), whose ultimate vacuum is about 0.5 mmHg, and preferably about 1 mmHg.

On the other hand, a process of producing an aliphatic polyester without using a high-performance pump is known, in which a ring-opening copolymerization reaction of a cyclic acid anhydride and a cyclic ether is performed. For example, Japanese Official Patent Gazette No. Showa 42-26708 proposed a process for producing an aliphatic polyester comprising performing a copolymerization reaction of a cyclic acid anhydride with an alkylene oxide (i.e., cyclic ether) using a catalyst system comprising as one component an organometallic compound of metal selected from groups I to III in the periodic law table.

The process of the above-mentioned Gazette will be explained briefly in the following. In Examples 1 to 6 of the Gazette, a cyclic acid anhydride, an alkylene oxide, a solvent and a catalyst are placed and dissolved in a polymerization tube (a tube for polymerization) to perform a nitrogen substitution. Subsequently, this tube is sealed, and a copolymerization reaction is performed in the sealed tube at 80° C. (Examples 1 to 4 and 6) or 30° C. (Example 5). An inside pressure of the sealed tube is higher than atmospheric pressure owing to a nitrogen gas and vapor of the solvent. The alkylene oxides used are epichlorohydrin in Examples 1 to 3 and propylene oxide in Examples 4 to 6. The cyclic acid anhydrides used are phthalic anhydride in Examples 1 to 4, endo-cis-bicyclo(2,2,1)-5-heptene-2,3-dicarboxylic anhydride in Example 5, and succinic anhydride in Example 6. The catalysts used are triethylaluminum in Examples 1 to 3 and 6, diethylzinc in Example 4, and diethylzinc and water in Example 5.

Among Examples 1 to 6 of the Gazette, an aliphatic polyester is formed only in Example 6 which comprises performing a ring-opening copolymerization reaction of a propylons oxide with a succinic anhydride. However, the aliphatic polyester formed in the Example 6 is inferior in that its melting point is low and thus it has less heat resistance since the cyclic ether used is a propylene oxide.

If a ring-opening copolymerization reaction of a cyclic acid anhydride containing a succinic anhydride as a main component with a cyclic ether containing an ethylene oxide as a main component is performed in the polymerization tube according to the process of the above mentioned Gazette, there is formed a polymer having a melting point lower than a polymer obtained from a polycondensation reaction of a dicarboxylic acid containing a succinic acid as a main component with a glycol containing an ethylene glycol as a main component. The reason is as follows. In the polycondensation reaction, dicarboxylic acid molecules and glycol molecules always bond one by one alternately. In contrast, in the ring-opening copolymerization reaction, not only cyclic acid anhydride molecules and cyclic ether molecules bond one by one alternately, but also the cyclic ether molecules bond with each other to form polyether chains.

In addition, in the process of the above-mentioned Gazette, the reaction takes as long as five to ten days. Thus, not only the copolymerization takes a long time, but also the yield of a resulting polymer is low. A reaction time may be shortened by raising a reaction temperature by introducing a succinic anhydride and an ethylene oxide collectively into the vessel. However, this process causes a defect in that polyether chains are formed and a melting point of a resulting aliphatic polyester is lowered.

The inventors of the present invention formerly proposed a process of producing an aliphatic polyester without using a high-performance vacuum pump in Japanese Official Patent Gazette No. Heidel 6-306154, in which a ring-opening copolymerization reaction of a cyclic acid anhydride containing a succinic anhydride as a main component with a cyclic ether containing an ethylene oxide as a main component using trialkoxyaluminium as a catalyst. However, the number-average molecular weight of a resulting aliphatic polyester is less than 25,000. Thus, the aliphatic polyester processed with molding, for example, into films or sheet, has some industrial problems in that resulting film or sheets are fragile or can not be elongated. Although the aliphatic polyester can have a higher molecular weight if it is reacted with a chain-elongating agent (i.e., cross linking agent), it not only increases the number of steps in a reaction process, but also possibly causes fish eye on a resulting film, thereby making the resulting film industrially disadvantageous. Given these circumstances, there is an increasing need for a process capable of producing an aliphatic polyester having the number-average molecular weight of not less than 20,000 efficiently in a single step.

SUMMARY OF THE INVENTION

It is therefore a first object of the present invention to provide a process capable of producing an aliphatic polyester having biodegradability and a higher melting point than an aliphatic polyester produced by a conventional method in an industrially efficient manner by comprising performing a ring-opening copolymerization reaction of materials (monomer), i.e., a cyclic acid anhydride with a cyclic ether. It is also the first object of the present invention to provide a process capable of producing an aliphatic polyester which has high industrial utility value and the number-average molecular weight of not less than 20,000 efficiently in a single step.

It is a second object of the present invention to provide a process capable of:

(1) performing a copolymerization at a vacuum of a general vacuum pump; and (2) producing an aliphatic polyester having biodegradability and a higher melting point than an aliphatic polyester produced by a conventional method in a relatively short period of time and in an industrially efficient and economical manner by reducing an amount of volatile components produced by a side reaction and a decomposition reaction.

To fulfill the first object, a process of producing an aliphatic polyester in accordance with the present invention is characterized by comprising a step of performing a ring-opening copolymerization reaction of a cyclic acid anhydride with a cyclic ether in the presence of zirconium compounds. A process of producing an aliphatic polyester in accordance with the present invention is also characterized by comprising a step of performing a ring-opening copolymerization reaction of a cyclic acid anhydride having a purity of not less than 99.0% with a cyclic ether having a purity of not less than 99.0%.

To fulfill the second object, a process of producing an aliphatic polyester in accordance with the present invention is characterized by comprising a step of performing a copolymerization reaction of a raw material of the aliphatic polyester with stirring under conditions of a reaction temperature in a range between 180° C. and 280° C., a reaction pressure in a range between 0.3 mmHg and 3.0 mmHg, so that a reaction system 0.1–30 hours after the reaction takes place has a viscosity in a range between 10 poise to 100,000 poise at a reaction temperature. A process of producing an aliphatic polyester in accordance with the present invention is also characterized by comprising steps of:

(1) performing a ring-opening copolymerization reaction of a cyclic acid anhydride with a cyclic ether and/or a cyclic ester in the presence of a catalyst; and (2) performing a polycondensation reaction of the resulting polymer with starring under conditions of a reaction temperature in a range between 180° C. and 280° C., a reaction pressure in a range between 0.3 mmHg and 3.0 mmHg, so that a reaction system 0.1–30 hours after the reaction takes place has a viscosity in a range between 10 poise to 100,000 poise at a reaction temperature.

According to the above processes, a copolymerization reaction can be performed at a vacuum of a general vacuum pump and an amount of volatile components produced by a side reaction and a decomposition reaction can be reduced. As a result, an aliphatic polyester having biodegradability and a higher melting point than an aliphalic polyester produced by a conventional process is produced in a relatively short period of time and in an industrially efficient and economical manner. Also, according to the above processes, an aliphatic polyester which has the number-average molecular weight of not less than 20,000 and hence high industrial utility value can be produced. Further according to the above processes, problems, such as production of gel compounds (i.e., by-products) or coloring of a resulting aliphatic polyester, can be eliminated.

Compared to an aliphatic polyester produced by a conventional process, the aliphatic polyester obtained by the above processes has a higher melting point because it has higher molecular weight and has substantially no polyether chains. For this reason, the aliphatic polyester obtained by the above processes can be readily processed with molding into films, sheets and the like and the resulting molded articles are superior in durability. Accordingly, the aliphatic polyester thus obtained can be effectively used for disposable packing materials, miscellaneous goods for daily use, and the like.

Other objects and advantages of the present invention will become apparent from the detailed description to follow taken in conjunction with the appended claims.

DESCRIPTION OF THE EMBODIMENTS

In this invention, a volatile component indicates a low-molecular component such as an excessive raw material, water generated by esterification reaction, glycol generated by ester exchange reaction, by-products generated by side-reaction, degradation products generated by decomposition reaction of aliphatic polyester, and the like. A melting point indicates a temperature measured in an atmosphere of nitrogen at a temperature elevation rate of 6K/minute by a general thermal analytical instrument (differential scanning calorimetry instrument). A viscosity was measured at a shear rate of 100 s$^{-1}$ according to JIS K 7199 at reaction temperature of a target aliphatic polyester under conditions of diameter (inner diameter) of capillary of 0.5 mm, and a ratio of capillary length to diameter (length/diameter)=20. The measurements by the differential scanning calorimetry, i.e., the measurements of a melting point were performed in a manner to be described later.

The method of producing an aliphatic polyester is not especially limited. However, examples of the method include:

a) A ring-opening copolymerization of cyclic acid anhydride and cyclic ether and/or cyclic ester in a presence of zirconium compound;

b) A polycondensation reaction after performing polybasic acid (or ester thereof, acid anhydride), aliphatic glycol, and/or aliphatic hydroxy carboxylic acid (or ester thereof) in a presence of catalyst; and c) A polycondensation reaction of the polymer produced by a ring-opening polymerization of cyclic acid anhydride and cyclic ether and/or cyclic ester in a presence of a catalyst. The method for producing aliphatic polyester is not especially limited, however such method can be classified by raw materials as follows:

(i) A polycondensation reaction of polybasic acid (or ester thereof, acid anhydride) with an aliphatic glycol;

(ii) A polycondensation reaction of a aliphatic hydroxy carboxylic acid (or ester thereof);

(iii) A ring-opening copolymerization reaction of cyclic acid anhydride with a cyclic ether; and (iv) A ring-opening polymerization reaction of a cyclic ester. A raw material of aliphatic polyester indicates, the above-listed polybasic acid, aliphatic glycol, aliphatic hydroxy carboxylic acid, cyclic acid anhydride, cyclic ether, cyclic ester, other monomers (to be described later) used as an occasion demands, and the like.

The polybasic acid used in method (i) is not especially limited. Examples of such polybasic acid include: polycarboxylic acid having at least two functional groups or ester thereof, acid anhydride; oxycarboxylic acid having at least three functional groups, and the like. To produce aliphatic polyester wherein a polybasic acid and an aliphatic glycol are linearly bonded, polybasic acid having two carboxyl groups in a molecule, i.e., aliphatic dicarboxylic acid, or ester thereof is preferable.

Examples of such polybasic acid include: aliphatic dicarboxylic acid such as succinic acid, adipic acid, suberic acid, sebacic acid, azelaic acid, decandicarboxylic acid, octadecandicarboxylic acid, dimer acid, esters thereof, and the like; acid anhydride such as succinic anhydride, adipic anhydride, iraconic anhydride, glutaric anhydride, adipic anhydride, citraconic anhydride, phthalic acid, trimellitic anhydride, and the like, polyfunctional acid anhydride such as pyromellitic dianhydride, benzophenone tetracarboxylic dianhydride, 1,2,3,4-butanetetracarboxylic dianhydride, homopolymers of maleic anhydride, copolymers of maleic anhydride with vinyl acetate, ethylene, isobuthylene, isobuthyl vinyl ether, acrylonitrile or styrene, and the like; oxycarboxylic acid having at least three functional groups such as malic acid, tartaric acid, citric acid, and the like. Only one kind of the above-listed cyclic acid anhydride may be adopted, or two or more kinds thereof may be suitably mixed and adopted.

Examples of aliphatic glycol include: ethylene glycol, propylene glycol, 1,3-propanediol, 1,4-butanedlol, neopentyl glycol, 1,5-pentanediol, 1,6-hexanediol, decamethylene glycol, and the like. It is permitted to substitute polyoxyalkylene glycol for part of aliphatic glycol. Examples of such polyoxyalkylene diglycol include: polyoxyethylene glycol, polyoxypropylene glycol, polyoxytetramethylene glycol, copolymers thereof, and the like. It is also permitted to substitute polyhydric alcohol having at least three functional groups for part of aliphatic glycol. Examples of such polyhydric alcohol include: glycerol, trimethylolpropane, pentaerythritol, and the like. It is permitted to substitute diepoxide for part of aliphatic glycol. Examples of such diepoxide include: polyethylene glycol diglycidyl ether, polypropylene glycol diglycidyl ether, polytetramethylene glycol diglycidyl ether, resorcinol diglycidyl ether, neopentyl glycol diglycidyl ether, 1,6-hexanediol diglycidyl ether, diglycidyl adipate, diglycidyl o-phthalate, diglycidyl terephthalate, hydroquinone diglycldyl ether, bisphenol S diglycidyl ether, glycerol diglycidyl ether, sorbitol polyglycidyl ether, sorbitan polyglycidyl ether, polyglycerol polyglycidyl ether, pentaerythritol polyglycidyl ether, diglycerol polyglycidyl ether, triglycidyl tris(2-hydroxyethyl)isocyanurate, glycerol triglycidyl ether, trimethylol propane polyglycidyl ether, and the like. Only one kind of the above-listed aliphatic glycol may be adopted, or two or more kinds thereof may be euitably mixed and adopted.

In view of a melting point, biodegradability, cost performance, etc., of the resulting aliphatic polyester, for a combination of a polybasic acid and an aliphatic glycol, a combination of an aliphatic dicarboxylic acid having 2–6 carbon atoms and an aliphatic glycol having 2–4 carbon atoms is preferable, and a combination of succinic acid and ethylene glycol and/or 1,4-butandio is more preferable.

In method (i), a polycondensation reaction may be carried out after polybasic acid and aliphatic glycol are mixed all at once, or may be carried out by gradually adding polybasic acid and/or aliphatic glycol to a reaction system as the reaction progresses.

Such polycondensation reaction in method (i) may be performed by general ester exchange reaction or esterification reaction, or a combination thereof. In the polycondensation reaction, a degree of polymerization can be raised by increasing or decreasing pressure in the reaction vessel (reaction system) as an occasion demands. Alternatively, a degree of polymerization can be raised by carrying out an ester exchange reaction subsequent to a general esterification reaction. In this case, it is not necessarily that the ester exchange reaction and the esterification reaction are clearly distinguishable.

Examples of the catalyst used in the method (i) and (ii) include: organometallic compounds including at least one metal selected from a group consisting of: titan, germanium, zinc, iron, manganese, cobalt, zirconium, hafnium, banadium, iridium, lanthanum, cerium, lithium, calcium, magnesium, tin, barium, nickel, etc.; organic acid salts, metal alkoxide, metallic oxide, metal hydroxide, carbonate, phosphate, sulfate, nitrate, chloride, and the like. Only one kind of the above-listed catalysts may be adopted, or two or more kinds thereof may be suitably mixed and adopted. The amount for use of the catalyst is not especially limited, however, it is usually in the range of 0.001 parts by weight to 5 parts by weight based on 100 parts by weight of aliphatic polyester, preferably in the range of 0.01 parts by weight to 0.5 parts by weight. In addition, a combined reaction of the esterification reaction by dehydrizing condensation and the ester exchange reaction may be carried out in such a manner that after carrying out the esterfication reaction in an absence of catalyst, the ester exchange reaction is carried out in the presence of a catalyst.

Examples of aliphatic hydroxycarboxylic acid used in method (if) include, glycolic acid, lactic acid, 3-hydroxy propionic acid, 3-hydroxy-2,2-dimethyl propionic acid, 3-hydroxy -3-methylbutyric acid, 4-hydroxy burytic acid, 5-hydroxy valeric acid, 3-hydroxy burytic acid, 3-hydroxy valeric acid, 4-hydroxy valeric acid, 6-hydroxy caproic acid, citric acid, maleic acid, esters thereof, and the like. Only one kind of the above-listed aliphatic hydroxycarboxylic acid may be used, or two or more kinds thereof may be suitably mixed and adopted.

The polycondensation reaction in method (ii) may be performed by general ester exchange reaction or esterification reaction, or a combination thereof. In the polycondensation reaction, a degree of polymerization is raised by increasing or decreasing pressure in the reaction vessel (reaction system) as an occasion demands.

The cyclic acid anhydride used in method (iii) is not especially limited, and any cyclic acid anhydride having at least one acid anhydride in a molecule may he used. In addition, to produce an aliphatic polyester in which a cyclic acid anhydride and a cyclic ether are linearly bonded, a cyclic acid anhydride having one acid anhydride in a molecule is preferable.

Examples of such cyclic acid anhydride include: acid anhydride such as succinic anhydride, maleic anhydride, itaconic anhydride, glutaric anhydride, adipic anhydride, altraconic anhydride, phthalic acid, trimellitic anhydride, and the like, polyfunctional acid anhydride such as pyromellitic dianhydride, benzophenone tetracarboxylic dianhydride, 1,2,3,4-butanetetracarboxylic dianhydride, homopolymers of maleic anhydride, copolymers of maleic anhydride with vinyl acetate, ethylene, isobutylene, isobutyl vinyl ether, acrylonitrile or styrene, and the like. Only one kind of the above-listed cyclic acid anhydride may be adopted, or two or more kinds thereof may be suitably mixed and adopted.

In view of a melting point, biodegradability and cost performance, etc., of the resulting aliphatic polyester, a cyclic acid anhydride having a succinic anhydride as a main component is preferable. The content of succinic anhydride in cyclic acid anhydride is preferably not less than 50 mole percent, more preferably not less than 80 mole percent. If the content of succinic anhydride is less than 50 mole percent, the resulting aliphatic polyester may have a low melting point and insufficient biodegradability.

The content of impurity, i.e., the ring-opening product of cyclic acid anhydride in the cyclic acid anhydride is preferably not more than 2 percent by weight, more preferably not more than 1 percent by weight, and still more preferably not more than 0.5 percent by weight when the content of the ring-opening product of cyclic acid anhydride is more than 2 percent by weight, the average molecular weight (Mn) of the resulting aliphatic polyester would be lowered. Therefore, it is industrially unpreferable.

The cyclic ether used in method (iii) is not especially limited, and any cyclic acid anhydride having at least one epoxy group in a molecule may be used. Additionally, to obtain aliphatic polyester in which a cyclic acid anhydride and a cyclic ether are linearly bonded, a cyclic ether having one epoxy group in a molecule is preferably adopted.

Examples of such cyclic ether include: ethylene oxide, propylene oxide, cyclohexene oxide, styrene oxide, epichlorohydrin, allyl glycidyl ether, phenyl glycidyl ether, tetrahydrofuran, oxetane, 1,3-dioxolane; polyethylene glycol diglycidyl ether, polypropylene glycol diglycidyl ether, polytetramethylene glycol diglycidyl ether, resorcinol diglycidyl ether, neopentyl glycol diglycidyl ether, 1,6-hexanediol diglycidyl ether, diglycidyl adipate, diglycidyl o-phthalate, diglycidyl terephthalate, hydroquinone diglycidyl ether, bisphenol S diglycidyl ether, glycerol diglycidyl ether, sorbitol polyglycidyl ether, serbitan polyglycidyl ether, polyglycerol polyglycidyl ether, pentaerythritol polyglycidyl ether, diglycerol polyglycidyl ether, triglycidyl tris(2-hydroxyethyl)isocyanurate, glycerol triglycidyl ether, trimethylol propane polyglycidyl ether, and the like. Only one kind of the above-listed cyclic ether may be adopted, or two or more kinds thereof may be suitably mixed and adopted.

In view of a melting point, biodegradability and cost performance, etc., of the resulting aliphatic polyester into consideration, a cyclic ether having ethylene oxide as a main component is preferable. The content of ethylene oxide in the cyclic ether is preferably not less than 50 mole percent, more preferably not less than 80 mole percent. When the content of ethylene oxide is less than 50 mole percent, the resulting aliphatic polyester may have a low melting point and insufficient biodegradability.

The content of inpurities in the cyclic ether, i.e., the ring-opening product in the cyclic ether is preferably not more than 2 percent by weight, more preferably not more than 1 percent by weight, and still more preferably not more than 0.5 percent by weight. When the content of the ring-opening product of the cyclic ether is more than 2 percent by weight, the average molecular weight (Mn) of the resulting aliphatic polyester would be lowered. Therefore, it is industrially unpreferable.

For the above-mentioned reason, among combinations of cyclic acid anhydride and cyclic ether, a combination of cyclic acid anhydride having succinic anhydride as a main component and cyclic ether having ethylene oxide as a main component is preferable, and a combination of succinic anhydride and ethylene oxide is most preferable.

To the cyclic acid anhydride and the cyclic ether, other monomer that can be copolymerizable with these monomers may be added as long as the effects of the present invention can be ensured. In the present invention, such monomer is not especially limited. Examples of the monomer include: cyclic ether such as β-butyrolactone, pivalolactone, ε-caprolactone, δ-valerolactone, glycolide, lactide, and the like; cyclic sulfur compounds such as ethylene sulfide, propylene sulfide, propiosultone, propiosultam, and the like; cyclic nitrogen compounds such as ε-caprolactam, ω-caprylolactam, ethylene imine, 2-phenyl oxazoline, succinimide, and the like, cyclic carbonate such as ethylene carbonate, etc. Only one kind of the above-listed monomer may be adopted, or two or more kinds thereof may be suitably mixed and adopted.

Examples of the cyclic ether used in method (iv) include: β-propiolactone, β-methyl-β-propiolactone, δ-valerolactone, ε-caprolactane, glycolide, lactide, and the like. Only one kind of the above-listed cyclic ether may be adopted, or two or more kinds thereof may be suitably mixed and adopted.

In methods (iii) and (iv), the ring-opening polymerization reaction may be carried out by such a polymerization method as polymerization in a solvent, bulk polymerization and the like in a presence of conventional catalyst (ring-opening polymerization catalyst).

Examples of the catalyst include: alkoxyzirconium (zirconium compounds) such as tetramethoxyzirconium, tetra-ethoxyzirconium, tetra-iso-propoxyzirconium, tetra-iso-buthoxyzirconium, tetra-n-buthoxyzirconium, tetra-t-buthoxyzirconium, and the like; oxyzirconium salts (zirconium compound) such as zirconium chloride oxide, zirconium propionate, zirconium 2-ethylhexanoate, zirconium stearate, zirconium nitrate, zirconium hydroxide, zirconium carbonate hydroxide oxide, zirconium phosphate, zirconium sulfate, zirconyl carbonate ammonium, and the like, metallocene compounds such as zirconocene dichloride (zirconium compound), titanocene dichloride, and the like; metal alkoxides such as triethoxyaluminum, tri-n-propoxyaluminum, tri-iso-propoxyaluminum, tri-n-buthoxyaluminum, tri-iso-buthyoxyaluminum, tri-sec-buthoxyaluminm, mono-sec-buthoxy-di-iso-propoxyaluminum, diisopropoxyaluminum ethylacetoacetate, aluminum tris(ethylacetoacetate), tetraethoxytitanium, tetra-iso-propoxytitanium, tetra-n-propoxytitanium, tetra-n-buthoxytitanium, tetra-sec-buthoxytitanium, tetra-t-buthoxytitanium, tri-iso-propoxygallium, tri-iso-propoxyantimony, tri-iso-buthoxyantimony, trimethyoxyboron, triethyoxyboron, tri-iso-propoxyboron, tri-n-propoxyboron, tri-iso-buthoxyboron, tri-n-buthoxyboron, tri-sec-buthoxyboron, tri-t-buthoxyboron, tri-iso-propoxygallium, tetramethoxygermanium, tetraethoxygermaniuan, tetra-iso-propoxygermanium, tetra-n-propoxygermanium, tetra-iso-buthoxygermanium, tetra-n-buthoxygermanium, tetra-sec-buthoxygermanium, tetra-t-buthoxygermanium, and the like; metal halides such as antimony pentachloride, zinc chloride, lithium bromide, tin(IV) chloride, cadmium chloride, boron trifluolide diethyl ether, and the like; alkyl aluminium such as trimethylaluminum, triethylaluminum, diethylaluminum chloride, ethylaluminium dichloride, tri-iso-buthylaluminium, and the like; derivatives of alkylaluminum such as polymethylaluminoxane, polyisobuthylaluminoxane, and the like; alkylzinc such as dimethyl zinc, diethyl zinc, diisopropyizinc, and the like; tertiary amine such as triallyl amine, triethyl amine, tri-n-oczyl amine, benzyldimethyl amine, and the like, heteropoly acid such as tungstophosphoric acid, molybdophosphoric acid, etc., or alkali metal salt thereof, and the llke.

Among the above-listed catalysts, zirconium compounds and trialkoxyaluminum are especially preferable. Among the zirconium compounds, tetraalkoxy zirconium and oxyzirconium salts are especially preferable. Among oxyzirconium salts, zirconium 2-ethylhexanoate, zirconyl carbonate and zirconyl hydroxide are especially preferable.

By adopting such zirconium compound, a still-higher molecular aliphatic polyester can be produced. The amount for use of the catalyst is not especially limited, however, it is usually in the range of 0.001 parts by weight to 10 parts by weight, preferably in the range of 0.01 parts by weight to 5 part by weight, and more preferably In the range of 0.1 parts by weight 1 parks by weight based on a total amount of the cyclic acid anhydride and cyclic ether. The manner of introducing the catalyst is not especially limited. For example, the catalyst may be added to cyclic acid anhydride, or may be added gradually.

Among the above-mentioned methods (i)–(iv), method (iii) is preferable because it enables aliphatic polyester to produce with industrially good efficiency in relatively short period of time. The method (iii) will be explained in more detail below.

Conventionally, it is known that the cyclic acid anhydride such as succinic anhydride is not polymerized alone. The inventors of the present invention have found that by the ring-opening polymerization reaction of the cyclic acid anhydride by gradually introducing a cyclic ether in the presence of the catalyst, an aliphatic polyester in which an acid component and an alcohol component are alternatively copolymerized in practice can be manufactured in a relatively short period of time.

The ring-opening polymerization reaction may be performed by such a polymerization method as polymerization in a solvent, bulk polymerization, and the like. In the case of the polymerization in a solvent, the cyclic acid anhydride is used in a solution state. In the case of the bulk polymerization, the cyclic acid anhydride is used in a melting state. The polymerization in a solvent may be performed in either a batch manner or continuous manner.

Examples of the solvent as used on this occasion are inert solvents such as benzene, toluene, xylene, cyclohexane, n-hexane, n-octane, dioxane, chloroform, dichloroethane and the like. Only one kind of the above-listed solvent may be adopted, or two or more kinds thereof may be suitably mixed and adopted.

For the above-mentioned reasons, the successive introduction of the cyclic ether into a reaction vessel is so performed that the rate per hour of introducing the cyclic ether is within the range of 3 parts by weight to 90 parts by weight, preferably 5 parts by weight to 50 part by weight, more preferably 14 parts by weight to 50 parts by weight based on 100 parts by weight of the cyclic acid anhydride. In the case where the rate per hour of introducing the cyclic ether is lower than the lower limit of 3 parts by weight, a reaction period becomes long and productivity becomes poor, which is industrially unpreferable. On the other hand, in the case where the rate is higher than the upper limit of 90 parts by weight, a polyether content in a reaction product increases so that there is obtained only a polyester having a low melting point, which is also industrially unpreferable. In the present invention, the successive introduction of the cyclic ether means not mixing a cyclic ether with a cyclic acid anhydride all at once and may be either continuous dropwise introduction of a cyclic ether into a reaction system or intermittent introduction separating the process into multiple steps. It is preferable to perform continuous introduction in such a manner that the introducing amount does not vary much with time.

In the present invention, a mole ratio of the reaction between the cyclic acid anhydride and the cyclic ether (cyclic acid anhydride/cyclic ether) is preferably in the range of 40/60 to 60/40. Taking the fact that a terminal carboxyl group of an aliphatic polyester and cyclic acid anhydride remaining in the aliphatic polyester lower the properties of the aliphatic polyester into consideration, the mole ratio is preferably in the range of 40/60 to 49/51 in which the cyclic ether exists in an excessive amount. When the ratio is in the above-mentioned range, a content of the terminal carboxylic group is less than 50 percent of all terminal groups of the aliphatic polyester, which raises a weight-loss starting temperature of the aliphatic polyester, thereby improving a heat resistance. If the ratio deviates from the above-mentioned range, the amount of an unreacted monomer would increases, resulting in low yield of the aliphatic polyester.

A reaction time is not especially limited, and it should be set according to factors such as a combination of a cyclic acid anhydride and a cyclic ether, a reaction pressure, a reaction temperature, the presence or absence of a solvent, the kind of a solvent present and a time required for introducing the cyclic ether.

In the present invention, it is preferable to gradually introduce the cyclic ether in a defined amount determined based on the mole ratio and then perform an ageing reaction by continuing a polymerization reaction at the aforementioned reaction temperature. After the completion of the ageing reaction, the resulting aliphatic polyester can be easily separated from the reaction system.

To still reduce the amount of volatile component generated, a manufacturing method using a ring-opening polymerization by which neither water nor glycol is generated is preferably adopted.

Next, the aforementioned method b), i.e., the process of polycondensation reaction of polybasic acid and aliphatic glycol, and/or aliphatic hydroxy carboxylic acid in a presence of catalyst will be explained in detail.

In method b), the volatile component generated by copolymerization is set not more than 25 percent by weight, preferably not more than 20 percent by weight, and still more preferably not more than 10 percent by weight based on the raw material. The method enables the aliphatic polyester to be industrially produced at low cost. When the content of the volatile component is more than 25 percent by weight, the vacuum down of the reaction system (rise in pressure) may be caused, or the performance of vacuum pump may be lowered, resulting in the problem that an extremely long time is required for reaction, or an aliphatic polyester having a predetermined molecular weight cannot be obtained.

The reaction conditions of the described method are not limited to the above. However, in the case of adopting method (i) and the case where a ring-opening polymerization reaction of the cyclic acid anhydride and the cyclic ether is performed by method (iii), and thereafter, an ester exchange reaction is performed to obtain a high-molecular aliphatic polyester, the ester exchange reaction is preferably performed at temperature in the range of 180° C. to 280° C., more preferably in the range of 235° C. to 280° C. The reaction pressure, i.e., the vacuum varies depending on an amount of volatile component generated. However, it is preferably in the range of 0.3 mmHg to 3.0 mmHg, more preferably in the range of 0.5 mmHg to 1.5 mmHg, still more preferably in the range of 1.0 mmHg to 1.5 mmHg. When the reaction temperature is below 180° C., an extremely long time would be required for the reaction. Thus, such condition is industrially unpreferable. On the other hand, when the reaction temperature is above 280° C., a large amount of a volatile component is generated, and the aliphatic polyester is colored. When the vaccum is less than 0.3 mmHg, i.e., the reaction pressure is less than 0.3 mmHg, a large amount of by-products generated by side reaction, or a large amount of low molecular compound (volatile component) such as degradation products by decomposition reaction would be generated, resulting in the problem that an extremely long time is required for the reaction, or the aliphatic polyester having a predetermined molecular weight cannot be obtained. Moreover, the aliphatic polyester cannot be produced at low cost. Thus, such condition is industrially unpreferable. On the other hand, when the vacuum, i.e., the reaction pressure is above 3.0 mmHg, an extremely long time would be required. Thus, it is industrially unpreferable.

Namely, it is preferable that the method of polycondensation reaction of aliphatic polyester in a presence of a catalyst wherein first a polycondensation reaction of a raw material of the aliphatic polyester is performed (hereinafter referred to as a primary reaction), and thereafter, an ester exchange reaction is performed (hereinafter referred to as a secondary reaction), in the presence of a catalyst is preferably performed under the following conditions:

primary reaction
 reaction temperature: 180° C. to 280° C.
 vacuum: 1.0 mmHg—normal pressure
secondary reaction
 reaction temperature: 180° C. to 280° C.
 vacuum: 0.5 mmHg–3.0 mmHg.

By the primary reaction, a polymerized product having a number-average molecular weight of at least 5,000 is obtained. By the secondary reaction, an aliphatic polyester having a number-average molecular weight in a range of 10,000 to 100,000 is obtained.

The ring-opening copolymerization method of the cyclic acid anhydride and the cyclic ether, the following conditions are preferable. Namely, it is preferable that the reaction temperature is set in the range of 10° C. to 250° C., more preferably in the range of 50° C. to 150° C., still more preferably in the range of 100° C. to 150° C. The reaction pressure varies according to factors such as a reaction temperature, the presence or absence of a solvent, and as to the kind of solvent present. However, the reaction pressure is preferably in the range of normal pressure to 50 kgf/cm$^2$, more preferably in the range of normal pressure to 15 kgf/cm$^2$. By performing a ring-opening copolmerization reaction, an aliphatic polyester having a number-average molecular weight of not less than 20,000 which is industrially variable can be obtained with high industrial efficiency by a single process. To maintain the reaction pressure in the above-mentioned range, it is preferable that the cyclic ether is gradually added to the cyclic acid anhydride. When the reaction pressure is above 50 kgf/cm$^2$, i.e., when a large amount of additive of the cyclic ether is added, a polyether ring is formed by bonding between unreacted cyclic ethers. Thus, such condition is industrially preferable.

As a result of earnest researches, the inventors of the present invention have found that among impurities included in the cyclic acid anhydride and cyclic ether, a material having an active hydrogen such as a free acid, water, alcohol, aldehyde, etc., is the main cause (factor) of reducing the number-average molecular weight of the aliphatic polyester. Thus, by distilling the material to improve the purity of the cyclic acid anhydride and the cyclic ether, the eliphatic polyester having a higher number-average molecular weight can be achieved. The purity of the cyclic acid anhydride and the cyclic ether can be improved by general method, such as distillation, recrystallization, crystallization, etc.

Therefore, in the ring-opening copolymerization of the cyclic acid anhydride and the cyclic ether, by setting the purities of the cyclic acid anhydride and the cyclic ether above 99.0 percent by weight, preferably above 99.5 percent by weight, the aliphatic polyester having a number-average molecular weight of not less than 20,000 can be obtained. The purity in the present invention includes a value (percent by weight) obtained by subtracting the value of the impurity (percent by weight) obtained by measuring the content of purities included in the cyclic acid anhydride or the cyclic ether from the total amount (100 percent by weight).

To increase the number-average molecular weight of the aliphatic polyester, it is preferable that the inside of the reaction vessel is completely dried, and an inside atmosphere of the reaction vessel is replaced by a nitrogen gas, and then a ring-opening polymerization is performed in an atmosphere of nitrogen using high purity raw material, catalyst, solvent, etc.

In any of the above-mentioned methods (i)–(iv), an aliphatic polyester having a number-average molecular weight of not less than 10,000 can be formed. The reactor used in the method for producing aliphatic polyester in accordance with the present invention will be described later. If the resulting aliphatic polyester has a number-average molecular weight of less than 10,000, or a still higher molecular weight is desired, the aliphatic polyester may be further subjected to general ester exchange reaction so as to have a higher number-average molecular weight. Alternatively, such high-molecular aliphatic polyester can be obtained by reacting with a chain-elongating agent of various kinds (cross-linking agent).

Examples of the chain-elongating agent include: isocyanate compounds, epoxy compounds, aziridine compounds, oxazoline compounds, polyvalent metal compounds, polyfunctional acid anhydride, phosphoric ester, phosphorous ester, and the like. Only one kind of the above-listed chain-elongating agents may be adopted, or two or more kinds thereof may be suitably mixed and adopted. A temperature at which the aliphatic polyester is reacted with the chain-elongating agent is not especially limited. However, the reaction is preferably performed at temperature in the range of 20° C. to 250° C., more preferably in the range of 100° C. to 200° C. The method of reacting the aliphatic polyester with the change-elongating agent is not especially limited. However, examples of such methods include: a method wherein the aliphatic polyester is dissolved in an appropriate solvent, and subsequently it is reacted with the chain-elongating agent; and a method wherein the aliphatic polyester is melted by heating, and subsequently it is reacted with the chain-elongating agent.

The isocyanate compounds used in the present invention are not especially limited, and any isocyanate compounds having at least two isocyanate groups in a molecule may be used. Examples of such isocyanate compounds include: isocyanate compounds such as tolylene diisocyanate (TDI), 4,4'-diphenylmethane diisocyanate (MDI), hexamethylene diisocyanate, xylylene diisocyanate, meta-xylene diisocyanate, 1,5-naphthalene diisocyanate, hydrogenated diphenyl methane diisocyanate, hydrogenated tolylene diisocyanate, xylylene hydride diisocyanate, isophorone diisocyanate, and the like; burette polyisocyanate compounds such as sumidule N (available from Sumitomo Bayer Urethane Co., Ltd.), and the like; polyisocyanate compounds having an isocyanate ring such as desmodule IL, HL (available from Bayer AG Co., Ltd.), corotate EH (available from Japan Polyurethane Kogyo Co., Ltd.) and the like; adduct polyisocyanate compounds such as sumidule L (available from Sumitomo Bayer Urethane Co., Ltd.), cozenate HL (available from Japan Polyurethane Kogyo Co., Ltd.); and the like. In addition, blocked isocyanate compound may be used. Only one kind of the above-listed isocyanate compounds may be adopted, or two or more kinds thereof may be suitably mixed and adopted.

When performing a urethane reaction between an aliphatic polyester and an isocyanate compound, the ratio of the respective contents is not especially limited. However, it is preferable, for example, a mole ratio of an isocyanate group in the isoccyanate compound and a terminal hydroxyl group in the aliphatic polyester (isocyanate group/hydroxyl group) is in the range of 0.5 to 3.0, mere preferably in the range of 0.8 to 1.5. To accelerate the urethan reaction, a known urethane catalyst such as an organic tin compound, a tertiary amine, etc., may be used as an occasion demands.

The epoxy compounds used in the present invention is not especially limited, and any epoxy compounds having at least two epoxy groups in a molecule may be used. Examples of such epoxy compound include: polyethylene glycol diglycidyl ether, polypropylene glycol diglycidyl ether, polytetramethylene glycol diglycidyl ether, resorcinol diglycidyl ether, neopentyl glycol digtycidyl ether, 1,6-hexanediol diglycidyl ether, diglycidyl adipate, diglycidyl o-phthalate, diglycidyl terephthalate, hydroquinone diglycidyl ether, hisphenol S diglycidyl ether, glycerol diglycidyl ether, sorbitol polyglycidyl ether, sorbitan polyglycidyl ether, polyglycerol polyglycidyl ether, pentaerythritol polyglycidyl ether, diglycerol polyglycidyl ether, triglycidyl tris(2-hydroxyethyl) isocyanurate, glycerol triglycidyl ether, trimethylol propane polyglycidyl ether, and the like. Only one kind of the above-listed epoxy compounds may be adopted, or two or more kinds thereof may be suitably mixed and adopted.

A manner of a reaction between an aliphatic polyester and an epoxy compounds is not especially limited. To accelerate the above reaction, a known catalyst, such as tertiary amine, quaternary ammonium salts, imidazole compounds, and the like may be used as occasion demands. Alternatively, epoxy compounds may be introduced whale aliphatic polyester is being produced. To be more specific, cyclic acid anhydrides, cyclic ether, and epoxy compounds may be reacted by the ring-opening polymerization. Also, the resulting product of the above ring-opening polymerization reaction may be further subject to a reaction with epoxy compounds.

The aziridine compound are not especially limited. Examples of the aziridine compond include, 2,2'-bis(hydroxymethyl)butanol-tris[aziridinyl)propionate], 3-(1-ethyleneglycol-bis[3-(1aziridinyl) propionate], polyethyleneglycol-bis[3-(1aziridinyl)propionate], propyleneglycol-bis[3-(1aziridinyl)propionate], polypropyleneglycol-bis[3-(1-aziridinyl)propionate], tetramethyleneglycol-bis[3-(aziridinyl)propionate], polytetramethyleneglycol-bis [3-(1-aziridinyl)propionate], N,N'-tetramethylenebisethylene urea, N,N'-hexamethylenebisethylene urea, N,N'-pentamethylenebisethylene urea, N,N'-heptamethylenebisethylene urea, N,N'-octamethylenebisethylene urea, N,N'-phenylenebisethylene urea, N'N- toluylenebisethylene urea, N,N'-diphenyl-4,4'-bisethylene urea, 3,3'-dimethyldiphenyl-4,4'-bisethylene urea, 3,3'-dimethoxydiphenyi-4,4'-bisethylene urea, diphenylmethane-p,p-bisethylene urea, and the like. Only one kind of the above-listed compounds may be adopted, or two or more kinds thereof may be suitably mixed and adopted. The amount for use of aziridine compounds in the aliphatic polyester is preferably in the range of 0.001 parts by weight to 10 parts by weight, and more preferably, in the range of 0.01 parts by weight to 5 parts by weight.

The oxazoline compounds are not especially limited. Examples of the oxazoline compounds include: 2-oxazoline, 2-methyl-2-oxazoline, 2-ethyl-2-oxazoline, 2-isopropyl-2-oxazoline, 2-butyl-2-oxazoline, 2-phenyl-2-oxazoline, 2,2'-bis(2-oxazoline), 2,2'-methylene-bis(2-oxazoline), 2,2'-ethylene-bis(2-oxazoline), 2,2'-trimethylene-bis(2-oxazoline), 2,2,-tetramethylene-bis(2-oxazoline), 2,2'-hexametylene-bis(2-oxazoline), 2,2'-octamethylene-bis(2-oxazoline),2,2,-ethylene-bis(4,4'-dimethyl-2-oxazoline), 2,2'-p-phenylene-bis(2-oxazoline), 2,2'-m-phenylene-bis-(2-oxazoline), 2,2'-m-phenylene-bis-(4,4'-dimethyl-2-oxazoline), bis-(2-oxazolinylcyclohexane) sulfide, bis-(2-oxazolinylnorbornane) sulfide, and the like. Only one kind of the above-listed compounds may be adopted, or two or more kinds thereof may be suitably mixed and adopted. Among the above-listed oxazoline compounds, 2,2'-m-phenylene-bis-(2-oxazoline) and bis-(2oxazolinylnorbornane) sulfide are especially preferable.

A reaction ratio between the aliphatic polyester and oxazoline compounds is not especially limited. However, for example, the mole ratio of 2-oxazoline group in the oxazoline compound to a terminal carboxyl group in the aliphatic polyester (i.e., 2-oxazoline group/carboxyl group) is preferably in the range of 0.5 to 10.0, and more preferably in the range of 0.8 to 5.0. To accelerate the reaction, a known catalyst, such as amine salts of acidic compounds, and the like may be used as occasion demands.

The polyvalent metal compounds used in the present invention are not specifically limited. Examples of the polyalent metal compounds include: organometallic compounds, metal salts, metal alkoxides, and the like having at least two valences. Preferable metals for the organometallic compounds or metal salts are, for example, zinc, calcium, copper, iron, magnesium, cobalt, barium, and the like. More preferable for the organometallic compounds and metal salts are zinc(II) acetylacetonate, zinc acetate, zinc formate, zinc propionate, zinc carbonate, and the like in which counter anions of the polyvalent metal compounds can be separated and recovered as volatile components from a reaction system by neutralization after reacting with the aliphatic polyester. Examples of the metal alkoxides include: alminium isopropoxide, mono-sec-butoxyaluminium diisopropoxide, aluminlum ethyoxide, tetraisopropoxytitanium, tetra-n-butoxytitanium, tetra(2-ethylhexyloxy)titanium, tetrastearyloxytitanlum, and the like. Only one kind of the above-listed compounds may be adopted, or two or more kinds thereof may be suitably mixed and adopted.

A reaction ratio between an aliphatic polyester and a polyvalent metal compound is not especially limited. However, in case where the polyvalent metal compounds are either organometallic compounds or metal salts (hereinafter referred to as organometallic compound and the like), the mole ratio of the organometallic compound and the like to a terminal carboxyl group aliphatic polyester (i.e., organometallic compounds/carboxyl group) is preferably in the range of 0.1 to 2.0, and more preferably in the range of 0.2 to 1.2. In the case where a reaction between a hydroxyl group at a terminal end of the aliphatic polyester and a metal alkoxide, for example, the mole ratio of the organometallic compounds and the like to a hydroxyl group at a terminal end of the aliphatic polyester (i.e., metal compounds/hydroxyl group) is preferably in the range of 0.1 to 2.0, and more preferably in the range of 0.2 to 1.2.

The polyfunctional acid anhydrides are not especially limited. Only one kind of the above-listed polyfunctional acid anhydride may be adopted, or two or more kinds thereof may be suitably mixed and adopted. An amount for use of the polyfunctional anhydrides in the aliphatic polyester is preferably in the range of 0.001 parts by weight to 10 parts by weight, and more preferably, in the range of 0.01 parts by weight to 5 parts by weight.

A manner of a reaction between the aliphatic polyester and polyfunctional acid anhydrides is not especially limited. The polyfunctional acid anhydrides may be introduced while the aliphatic polyester is being produced. To be more specific, cyclic acid anhydrides, cyclic ether, and polyfunctional acid anhydrides may be reacted through the ring-opening polymerization reaction. Also, the resulting product of the above ring-opening polymerization reaction may be further subject to a reaction with a polyfunctional acid anhydride.

The phosphoric ester and phosphorous ester in the present invention may be either diester or triester. Examples of the ester group include: a methyl group, an ethyl group, a propyl group, a butyl group, a phenyl group, a 2-ethylhexyl group, and the like. Among the above-listed ester groups, the methyl group, the ethyl group, and the phenyl group are especially preferable taking reactivity, cost performance, etc., into consideration. Only one kind of the above-listed phosphoric ester and phosphorous ester may be adopted, or two or more kinds thereof may be suitably mixed and adopted. A content of the phosphoric acid ester and phosphorous acid ester in the aliphatic polyester is preferably in the range of 0.001 parts by weight to 10 parts by weight, and more preferably, in the range of 0.01 parts by weight to 5 parts by weight.

The aliphatic polyester can have still higher molecular weight when reacted with a chain-elongating agent.

An aliphatic polyester in accordance with the present invention has a number-average molecular weight (Mn) in the range of 10,000 to 100,000. In view of heat resistance, mechanical strength, etc., the number-average molecular weight of the aliphatic polymer is preferably not less than 25,000, more preferably, not less than 40,000. In the case where the number-average molecular weight is less than 10,000, when melding into, for example, a film, problems would arise in that the aliphatic polyester is frangible or cannot be extended. Thus, such aliphatic polyester is industrially unpreferable. The aliphatic polyester having a number-average molecular weight of less than 10,000 can be polymerized by a reaction with a chain-elongating agent (crosslinking agent). However, this increases a number of steps required in the reaction process. Moreover, the crosslinking agent used in the reaction may cause a fish eye on a film. Thus, the aliphatic polyester having a number-average molecular weight of less than 10,000 is industrially unpreferable. On the other hand, when an aliphatic polyester having a number-average molecular weight of more than 100,000 is adopted, a long time is required for the reaction, thus such aliphatic polyester is industrially unpreferable. When a long time is required for the reaction, a volatile component generated by the decomposition, etc., of the aliphatic polyester would increase. For this reason, the number-average molecular weight is preferably not more than 80,000, more preferably not more than 70,000. Namely, the number-average molecular weight of the aliphanic polyester preferably falls in the range of 25,000 to 80,000, more preferably in the range of 40,000 to 70,000.

Next, a reaction vessel suited for the method of producing aliphatic polyester in accordance with the present invention will be explained below.

In the present invention, the reaction vessel is not especially limited as long as a polymerization (polycondensation reaction) of raw materials (polymerizod product resulting from ring-opening polymerization) of aliphatic polyester can be performed so as to have a degree of viscosity in the range of 10 poise to 10,000 poise, preferably in the range of 100 poise to 50,000 poise when 0.1–30 hours elapsed after the reaction started at reaction temperature of the reaction system under conditions of reaction temperature in the range of 180° C. to 280° C., more preferably in the range of 235° C. to 280° C., and reaction pressure in the range of 0.3 mmHg to 3.0 mmHg. However, the reaction vessel which permits a polymerization (polycondensation reaction) of raw materials (polymerized product resulting from ring-opening polymerization) of aliphatic polyester can be performed so as to have a degree of viscosity in the range of 10 poise to 10,000 poise, preferably in the range of 100 poise to 50,000 poise when 0.5–10 hours elapsed after the reaction started at reaction temperature of the reaction system under the above-mentioned conditions. For such reaction vessel, conventional reaction vessels such as longitudinal reaction vessels, lateral reaction vessels, high viscosity reaction vessels, etc., may be used.

By stirring the raw materials so as to satisfy the above-mentioned conditions, the surface (free surface) of the content (reaction vessel) is altered frequently. Namely, the total surface per unit time with respect to the volume of the content can be increased rapidly, resulting in large liquid-air contact face. As a result, a volatile component generated as the polymerization reaction progresses can be easily separated from the content.

For example, in the case of adopting a flask, a reaction furnace, etc., provided with a general agitator as a longitudinal reaction vessel, the above-mentioned conditions can be satisfied by slightly reducing the materials to be placed, i.e., the content in the reaction vessel. In addition, by adopting the reaction furnace provided with a helical ribbon blade or helical deformed baffle as an agitator, the raw materials can be stirred with still improved efficiency. Furthermore, by adopting a lateral single screw mixer (lateral reactor) provided with a stirring axis with a continuous deformed blade, or lateral swing reactor having two stiring axes with parallel two stirring axes, the raw materials can be stirred with still improved efficiency.

In the present invention, high viscosity reaction vessel of either batch type or continuous type may be used. Examples of the batch-type reaction vessel include: inverted conical ribbon blade-type reactor (available from Mitsubishi Heavy Industries, Ltd.), a twist gate blade-type reactor (available from Hitachi, Ltd.), etc. Examples of continuous type reactor include: Hitachi spectacle blade polymerizer (available from Hitachi, Ltd.), Hitachi gate blade polymerizer (available from Hitachi, Ltd.), a self-cleaning type reactor (available from Mitsubishi Heavy Industries, Ltd.), a lateral twin screw-type reactor (available from Mitsubishi Heavy Industries, Ltd.), a KRC kneader (available from Kurimoto Tekkosho Co., Ltd.,), TEX-K (available from The Japan Steel Works, Ltd.), a single screw extruder, a twin screw extruder for use in an extrusion molding or deaerating process of plastics, etc.

The available reaction vessel is not limited to the above-listed examples. In addition, the reaction vessel may be suitably adopted for a reaction between the aliphatic polyester and the chain-elongating agent.

Additives such as a crystallizing agent, dye, pigment, heat resisting agent, anti-oxidant, weather resisting agent, smoothing agent, anti-static agent, stabilizer, filler, reinforcement material, flame resisting agent, and plasticizer, or other polymers can be added to the aliphatic polyester as occasion demands to such an extent that does not impair the effect of the present invention. The other polymers may be, but not limited to, polyolefin such as polyethylene, aromatic polyester, and the like.

The aliphatic polyester in accordance with the present invention has biodegradability and desirable moldability. The aliphatic polyester can be molded by conventional molding method such as extrusion molding, injection molding, cast molding, vacuum molding etc., and such aliphatic polyester can be readily processed into molded articles including various components, containers, materials, instruments, etc., and fiber, film, sheet, etc.

Hereinafter, this invention is illustrated by the following examples of some preferred embodiments in comparison with comparative examples not according to the undermentioned examples. Furthermore, in the examples and comparative examples, the unit "part(s)" denotes "part(s) by weight".

In the following manner, the number-average molecular weight, the melting point of the aliphatic polyester and the purity of the raw material was measured, and the decomposition tests of the aliphatic polyester were performed in the following manner.

Number-Average Molecular Weight

The number-average molecular weight (Mn) of the aliphatic polyester was measured using a gel permeation chromatography under the following conditions. The number-average molecular weight referred herein was calculated as standard polystyrene.

Conditions of Measurements
    reactor: HLC-8020 (available from Tosho Co., Ltd.)
    column: Shodex K-805, 804, 803, 802 (available from Showa Denko K.K)
    elute: chloroform
    quantity of flow: 1 ml/min.
    temperature: 40° C.
    detector: RI Melting Point The melting point Tm (° C.) of the aliphatic polyester was measured in an atmosphere of nitrogen by a DSC instrument (Seiko Electronics Industry, Co, Ltd. Model: SSC5200). The measurement was carried out in the following manner. 20 mg of sample was completely melted by heating, and then the sample was reverted rapidly to −50° C. Thereafter, the sample was heated at a temperature elevation rate of 6K/minute. Then, the endothermic peak was measured. The obtained temperature was determined as a melting point Tm.

Biodegradability

First, a polyester resin composition was molded into a 200 μm thick film using a compression molding machine under conditions: molding temperature of 130° C., a molding pressure of 150 kg/cm$^2$, and a molding period of two minutes. Next, the resulting film was buried into a planter in which soil was placed and preserved for 100 consecutive days in a thermohumidstat of 23° C. and relative humidity 65 percent while a defined amount of water was sprinkled on the planter once a day. Thereafter, a change of outside appearance of the film was observed. Here, as the soil, there was used a mixture of soil sampled in Onohara, Minoo-shi, Japan, soil sampled in NIshi-Otabi-cho, Suita-shi, Japan, and leaf mold in the ratio of 3:1:3.

Purity

Purity of succinic anyhydride

The succinic acid contained in the succinic anhydride as impurities was determined by measuring $^1$H-NMR. Then, the purity (percent by weight) of succinic anhydride was measured by subtracting the succinic acid from the total amount of succtnic anhydride.

Purity of ethylene oxide

A free acid, water had aldehyde contained in ethylene oxide as impurities was determined. The free acid and aldehyde were determined by measuring them in accordance with JIS K 1526. Water was determined by using Karl Fisther's device. Then, the purity ethylene oxide (percent by weight) was measured by subtracting the free acid, water and aldehyde from the total amount of ethylene oxide.

EXAMPLE 1

To an autoclave provided with a thermometer, an agitator, and a nitrogen introducing tube, placed were 500.0 parts of succinic anhydride (cyclic acid anhydride) and 3.68 parts of zirconium 2-ethylhexanoate (zirconium compound) as a catalyst. An inside atmosphere of the autoclave was replaced by a nitrogen gas. Then, a temperature of the autoclave was gradually elevated to 130° C. with stirring to dissolve the succinic anhydride. While maintaining a temperature of the autoclave at 130° C. and an inside pressure of the autoclave in a range of 4.0 kgf/cm² to 8.5 kgf/cm², 231.1 parts of ethylene oxide (cyclic ether) was successively (gradually) introduced into the autoclave for 4.0 hours at the rate of 58 parts an hour. After the completion of the introduction of ethylene oxide, an ageing reaction was performed at 130° C. for 1 hour and then a temperature of a system was reverted to normal temperature, thereby obtaining a high-polymer product.

A procedure, wherein the resulting polymerized product was dissolved in a defined amount of chloroform and precipitated in a defined amount of tetrahydrofuran for purification, was thrice repeated to obtain an aliphatic polyester at a yield of 99.2 percent.

The resulting aliphatic polyester had a number-average molecular weight of 13,000 and a melting point of 104.4° C. A content of a carboxyl group in the polyester was determined by neutralization titration to be 0.0420 mmol/g. The results of the measurements of this example show that a ratio of the carboxyl group to terminal ends of the aliphatic polyester was 27.3 percent.

To a self-cleaning type twin screw mixer (S1 KRC reactor made by Kurimoto Tekkosho Co., Ltd., inner diameter 25 mm, L/D=10.2), placed were 70.0 parts of the aliphatic polyester, and 0.700 parts of diphenyl phosphite (chain-elongating agent). A reaction was performed in a nitrogen gas current for 1.5 hours under conditions of vacuum (pressure) 0.15 mmHg~0.2 mmHg, jacket temperature 240° C., and mixing rate 100 rpm, thereby obtaining a polyester resin composition.

The resulting poKyester resin composition, i.e., a polymerized aliphatic polyester had a number-average molecular weight of 50,000, and a melting point of 104.2° C. The polyester resin composition had biodegradability. The results of measurements and experiments of this example are shown in Table 1. In Table 1 under column "biodegradability", the results were described as follows.

(+): A change of outside appearance was recognized.

(−): It A change of outside appearance was not recognized.

EXAMPLE 2

To an autoclave provided with a thermometer, an agitator, and a nitrogen introducing tube, placed were 500.0 parts of succinic anhydride (cyclic acid anhydride) and 3.70 parts of tetra-t-buthoxyzirconium (zirconium compound) as a catalyst. An inside atmosphere of the autoclave was replaced by a nitrogen gas. Then, a temperature of the autoclave was gradually elevated to 130° C. with stirring to dissolve the succinic anhydride. While maintaining a temperature of the autoclave at 130° C. and an inside pressure of the autoclave in a range of 4.0 kgf/cm² to 8.4 kgf/cm², 231.5 parts of ethylene oxide (cyclic ether) was successively (gradually) introduced into the autoclave for 4.0 hours at the rate of 58 parts an hour. After the completion of the introduction of ethylene oxide, an ageing reaction was performed at 130° C. for 1 hour and then a temperature of a system was reverted to normal temperature, thereby obtaining a polymerizod product.

The same rectification process as Example 1 was performed in the same manner, and a polymerized product was rectified, thereby obtaining an aliphatic polyester at a yield of 99.5 percent.

The resulting aliphatic polyester had a number-average molecular weight of 15,000 and a melting point of 103.9° C. A content of a carboxyl group in the polyester was determined by neutralization titration to be 0.0330 mmol/g. The results of the measurements of this example show that a ratio of the carboxyl group to terminal ends of the aliphatic polyester was 24.8 percent.

To the same mixer as Example 1, placed were 70.0 parts of the aliphatic polyester, and 0.700 parts of diphenyl phosphite. A reaction was performed in a nitrogen gas current for 1.75 hours under conditions of vacuum (pressure) 0.15 mmHg–0.2 mmHg, jacket temperature 240° C., and mixing rate 100 rpm, thereby obtaining a polyester resin composition. The total time required for the reaction was 6.75 hours.

The resulting polyester resin composition, i.e., a polymerized aliphatic polyester had a number-average molecular weight of 52,000, and a melting point of 103.5° C. The polyester resin composition had biodegradability. The results of measurements and experiments of this example are shown in Table 1.

EXAMPLE 3

The same reaction as Example 1 was performed in the same manner, and an aliphatic resin composition was obtained.

To the see mixer as used in Example 1, placed was 70.0 parts of aliphatic polyester. A reaction was performed in a nitrogen gas current for 0.83 hours under conditions of vacuum 0.15 mmH. g–0.2 mmHg, reaction temperature 270° C., and mixing rate 100 rpm, thereby obtaining a polymerizod aliphatic polyester. The total time required for the reaction was 5.83 hours. The resulting aliphatic polyester had a number-average molecular weight of 51,000 and a melting point of 104.0° C. In addition, the aliphatic polyester had biodegradability. The results of measurements and experiments of this example are shown in Table 1.

EXAMPLE 4

To an autoclave provided with a thermometer, an agitator, and a nitrogen introducing tube, placed were 500.0 parts of succinic anhydride and 3.68 parts of zirconium 2-ethylhexanoate. An inside atmosphere of the autoclave was replaced by a nitrogen gas. Then, a temperature of the autoclave was gradually elevated to 130° C. with stirring to dissolve the succinic anhydride. While maintaining a temperature of the autoclave at 130° C. and an inside pressure of the autoclave in a range of 4.0 kgf/cm² to 8.0 kgf/cm², and a mixture of 231.0 parts of ethylene oxide (cyclic ether) and 2.58 parts of diglycidyl adipate (denacohol EX-701 available from Nagass Kasei Co., Ltd.) was successively (gradually) introduced into the autoclave for 4.0 hours at the rate of 58 parts an hour. After the completion of the introduction of ethylene oxide, an ageing reaction was performed at 130° C. for 1 hour and then a temperature of a system was reverted to normal temperature, thereby obtaining a high-molecular product.

The same rectification process as Example 1 was performed in the same manner, and a polymerizod product was rectified, thereby obtaining an aliphatic polyester at a yield of 99.2 percent.

The resulting aliphatic polyester had a number-average molecular weight of 14,000 and a melting point of 104.6° C. A content of a carboxyl group in the polyester was determined by neutralization titration to be 0.0350 mmol/g. The results of the measurements of this example show that a ratio of the carboxyl group to terminal ends of the aliphatic polyester was 24.5 percent.

To the same mixer as Example 1, placed were 70.0 parts of the aliphatic polyester, and 0.700 parts of diphenyl phosphite. A reaction was performed in a nitrogen gas current for 1.75 hours under conditions of vacuum (pressure) 0.15 mmHg–0.2 mmHg, reaction temperature 240° C., and mixing rate 100 rpm, thereby obtaining a high-molecular aliphatic polyester. The total time required for the reaction was 6.75 hours.

The resulting high-molecular polyester resin composition had a number-average molecular weight of 55,000, and a melting point of 104.1° C. The polyester resin composition had biodegradability. The results of measurements and experiments of this example are shown in Table 1.

EXAMPLE 5

The same reaction as Example 1 was performed in the same manner, and an aliphatic resin composition was obtained. To the same mixer as used in Example 1, placed was 70.0 parts of the aliphatic polyester. A reaction was performed in a nitrogen gas current for 4.0 hours under conditions of normal pressure, reaction temperature 270° C., and mixing rate 100 rpm, thereby obtaining an aliphatic polyester. The total time required for the reaction was 9.0 hours.

The resulting aliphatic polyester had a number-average molecular weight of 47,000 and a melting point of 103.1° C. In addition, the aliphatic polyester had biodegradability. The results of measurements and experiments of this example are shown in Table 1.

EXAMPLE 6

The same reaction as Example 1 was performed in the same manner, and an aliphatic resin composition was obtained. To the same mixer as used in Example 1, placed was 70.0 parts of the aliphatic polyester. A reaction was performed in a nitrogen gas current for 5.0 hours under conditions of vacuum 0.15 mmHg–0.2 mmHg, reaction temperature 190° C., and mixing rate 100 rpm, thereby obtaining a high-polymer aliphatic polyester. The total time required for the reaction was 10.0 hours.

The resulting aliphatic polyesner had a number-average molecular weight of 50,000 and a melting point of 103.4° C. In addition, the aliphatic polyester had biodegradability. The results of measurements and experiments of this example are shown in Table 1.

EXAMPLE 7

To an autoclave provided with a thermometer, an agitator, a nitrogen introducing tube, and a flow dividing condenser placed were 300.0 parts of succinic anhydride (polybastc acid), 195.0 parts of ethylene glycol (aliphatic glycol) and 0.54 parts of tetra-iso-propoxytitan as a catalyst. An inside atmosphere of the autoclave was replaced by a nitrogen gas. Then, the mixture in the flask was subjected to reaction with stirring for 6.5 hours at temperature in a range of 150° C. to 220° C., and subjected to further reaction at temperature in a range of 70° C. to 210° C. for 16 hours and vacuum in a range of 0.1 mmHg to 10 mmHg, thereby obtaining an aliphatic polyester. The resulting aliphatic polyester had a number-average molecular weight of 13,300.

To the same mixer as Example 1, placed was 70.0 parts of the aliphatic polyester. A reaction was performed in a nitrogen was current for 8.0 hours under conditions of vacuum 0.1 mmHg–0.2 mmHg, reaction temperature 240° C., and mixing rate 100 rpm, thereby obtaining a polyester resin composition. The total time required for the reaction was 27.5 hours.

The resulting aliphatic polyester, i.e., a high-molecular aliphatic polyester had a number-average molecular weight of 53,000, and a melting point of 105.1° C. The polyester resin composition had biodegradability. The results of measurements and experiments of this example are shown in Table 1.

EXAMPLE 8

The same reaction as Example 1 was performed in the same manner, and an aliphatic resin composition was obtained. To the same mixer as used in Example 1, placed was 70.0 parts of the aliphatic polyester. A reaction was performed in a nitrogen gas current for 5.0 hours under conditions of normal pressure, reaction temperature 220° C., and mixing rate 100 rpm, thereby obtaining a high-molecular aliphatic polyester. The total time required for the reaction was 10.0 hours.

The resulting aliphatic polyester had a number-average molecular weight of 21,000 and a melting point of 103.7° C. In addition, the aliphatic polyester had biodegradability. The results of measurements and experiments of this example are shown in Table 1.

EXAMPLE 9

The same reaction as Example 1 was performed in the same manner, and an aliphatic resin composition was obtained. To the same mixer as used in Example 1, placed was 70.0 parts of the aliphatic polyester. A reaction was performed in a nitrogen gas current for 5.0 hours under conditions of vacuum 0.15 mmHg–0.2 mmHg, reaction temperature 160° C., and mixing rate 100 rpm, thereby obtaining a high-polymer aliphatic polyester. The total time required for the reaction was 10.0 hours.

The resulting aliphatic polyester had a number-average molecular weight of 20,000 and a melting point of 102.9° C. In addition, the allphatic polyester had biodegradability. The results of measurements and experiments of this example are shown in Table 1.

TABLE 1

|  | Example 1 | Example 2 | Example 3 | Example 4 | Example 5 |
|---|---|---|---|---|---|
| number-average molecular weight (Mn) | 50000 | 52000 | 51000 | 55000 | 47000 |
| vacuum (mmHg) | 0.15–0.2 | 0.15–0.2 | 0.15–0.2 | 0.15–0.2 | normal pressure |
| temperature (°C.) | 240 | 240 | 270 | 240 | 270 |
| total reaction time (hr) | 6.5 | 6.75 | 5.83 | 6.75 | 9.0 |
| melting point (°C.) | 104.2 | 103.5 | 104.0 | 104.1 | 103.1 |
| Biodegradability | (+) | (+) | (+) | (+) | (+) |

|  | Example 6 | Example 7 | Example 8 | Example 9 |
|---|---|---|---|---|
| number-average molecular weight (Mn) | 50000 | 53000 | 21000 | 20000 |
| vacuum (mmHg) | 0.15–0.2 | 0.1–0.2 | normal pressure | 0.15–0.2 |
| reaction temperature (°C.) | 190 | 240 | 220 | 160 |

TABLE 1-continued

| total reaction time (hr) | 10.0 | 27.5 | 10.0 | 10.0 |
|---|---|---|---|---|
| melting point (°C.) | 103.4 | 105.1 | 103.7 | 102.9 |
| Biodegradability | (+) | (+) | (+) | (+) |

EXAMPLE 10

An one-litter autoclave provided with a thermometer, an agitator, and a nitrogen introducing tube was prepared. An inside atmosphere of the autoclave was replaced by a nitrogen gas to fully drive the inside of the autoclave. To the autoclave, placed were 386.0 parts of succinic anhydride (available from Lonza Ltd.,) and 2.31 parts of zirconium 2-ethylhexanoate (available from Daiichi kigenso Kagaku Kogyo Ltd.,) as a catalyst. An inside atmosphere of the autoclave was replaced by a nitrogen gas.

The purity of the succinic anhydride was 99.8 percent by weight. After performing dehydrizing and drying process of zirconium 2-ethylhexanoate using calcium hydride, a filtration was performed.

The content of a free acid (impurites) included in the zirconium 2-ethylhexanoate was not more than 0.008 mole percent with respect to succinic anhydride. The content of water (impurities) was not more than 0.02 mole percent with respect to succinic anhydride.

Then, a temperature of the autoclave was gradually elevated to 130° C. with stirring to dissolve the succinic anhydride. While maintaining a temperature of the autoclave at 130° C. and an inside pressure of the autoclave in a range of 4.2 kgf/cm$^2$ to 7.5 kgf/cm$^2$, 179.85 parts of ethylene oxide (available from Nippon Shokubai Co., Ltd.) was successively (gradually) introduced into the autoclave for 6.5 hours at the rate of 27.7 parts an hour. After the completion of the introduction of ethylene oxide, an ageing reaction (ring-opening copolymerization) was performed at 130° C. for 1.0 hour and then a temperature of a system was reverted to normal temperature, thereby obtaining an aliphatic polyester.

The succinic anhydride remaining in the aliphatic polyester was determined by measuring $^1$H-NMR. As a result, the aliphatic polyester has a yield of 99.8 percent, a number-average molecular weight of 37,800 and a melting point of 101.3° C. The results of measurements in this example are shown in Table 2.

EXAMPLE 11

An one-litter autoclave provided with a thermometer, an agitator, and a nitrogen introducing tube was prepared. An inside atmosphere of the autoclave was replaced by a nitrogen gas to fully drive the inside of the autoclave. To the autoclave, placed were 300.0 parts of succinic anhydride (available from Lonza Ltd.,), 1.45 parts of zirconium 2-ethylhexanoate (available from Daiichi Kigenso Kagaku Kogyo Co. Ltd.,) and 30 parts of cyclohexane as a solvent. An inside atmosphere of the autoclave was replaced by a nitrogen gas.

The purity of the succinic anhydride was 99.8 percent by weight. After performing dehydrizing and drying process of zirconium 2-ethylhexanoate using calcium hydride, a filtration was performed.

The content of a free acid (impurities) included in the zirconium 2-ethylhexanoate was not more than 0.008 mole percent with respect to succinia anhydride. The content of water (impurities) was not more than 0.02 mole percent with respect to succinic anhydride. After performing the dehydrizing and drying process of cyclohexane using molecular sieves (synthetic zeolite) and a filtration was performed.

Then, a temperature of the autoclave was gradually elevated to 130° C. with stirring to dissolve the succinic anhydride. While maintaining a temperature of the autoclave at 130° C. and an inside pressure of the autoclave in a range of 4.3 kgf/cm$^2$ to 8.1 kgf/cm$^2$, 145.36 parts of ethylene oxide (available from Nippon Shokubai Co., Ltd.) was successively (gradually) introduced into the autoclave for 6.5 hours at the rate of 22.36 parts an hour. After the completion of the introduction of ethylene oxide, an ageing reaction (ring-opening copolymerization) was performed at 130° C. for 1.5 hours and then a temperature of a system was reverted to normal temperature, thereby obtaining an aliphatic polyester.

The sucoinic anhydride remaining in the aliphatic polyester was determined by measuring $^1$H-NMR. As a result, the aliphatic polyester has a yield of 99.9 percent, a number-average molecular weight of 42,300 and a melting point of 104.2° C. The results of measurements in this example are shown in Table 2.

EXAMPLE 12

A reaction was performed in the same autoclave as the autoclave used in Example 10. First, an inside atmosphere of the autoclave was replaced by a nitrogen gas to fully drive the inside of the autoclave. To the autoclave, placed were 300.0 parts of succinic anhydride (available from Lonza Ltd.,), and 1.643 parts of zirconocene dichloride (zirconium compound) (available from Tokyo Chemical Industries Co. Ltd.,) as a catalyst. Then, inside atmosphere of the autoclave was replaced by a nitrogen gas.

The purity of the succinic anhydride was 99.8 percent by weight. The purity of zirconocene dichloride was not less than 97 percent by weight.

Then, a temperature of the autoclave was gradually elevated to 130° C. with starring to dissolve the succinic anhydride. While maintaining a temperature of the autoclave at 130° C. and an inside pressure of the autoclave in a range of 4.1 kg#/cm$^2$ to 8.1 kgf/cm$^2$, 158.6 parts of ethylene oxide (available from Nippon Shokubai Co., Ltd.) was successively (gradually) introduced into the autoclave for 10.0 hours at the rate of 15.9 parts an hour. After the completion of the introduction of ethylene oxide, an ageing reaction (ring-opening copolymerization) was performed at 130° C. for 1.5 hour and then a temperature of a system was reverted to normal temperature, thereby obtaining an aliphatic polyester.

The succinic anhydride remaining in the aliphatic polyester was determined by measuring $^1$H-NMR. As a result, the aliphatic polyester has a yield of 99.4 percent, a number-average molecular weight of 28,000 and a melting point of 94.4° C. The results of measurements are shown in Table 2.

Next, the effect of the respective purities of the succinic anhydride and the ethylene oxide on the number-average molecular weight was examined. Accordingly, the following comparative examples 1 and 2 are provided in comparison with Examples 10–12.

Comparative Example 1

A reaction was performed using the same autoclave as the autoclave used in Example 10. First, an inside atmosphere was replaced by a nitrogen gas to fully dry the inside of the autoclave. To the autoclave, placed were 500.0 parts of succinic anhydride (available from WAKO Pure Chemical Industries Ltd.) and 2.99 parts of zirconium 2-ethylhexanoate (available from Daiichi Kigenso Kagaku Kogyo Co. Ltd.,). An inside atmosphere of the autoclave was replaced by a nitrogen gas.

The purity of the succinic anhydride was 98.8 percent by weight. After performing dehydrizing and drying process of zirconium 2-ethylhexanoate using hydrogenerated calcium, a filtration was performed.

The content of a free acid (impurities) included in the zirconium 2-ethylhexanoate was not more than 0.008 mole percent with respect to succinic anhydride. The content of water (impurities) was 0.02 mole percent based on succinic anhydride.

Then, a temperature of the autoclave was gradually elevated to 130° C. with stirring to dissolve the succinic anhydride. While maintaining a temperature of the autoclave at 130° C. and an inside pressure of the autoclave in a range of 4.0 kgf/cm$^2$ to 8.5 kgf/cm$^2$, 231.1 parts of ethylene oxide (available from Nippon Shokubai Co., Ltd.) was successively (gradually) introduced into the autoclave for 4.0 hours at the rate of 58 parts an hour. The purity of ethylene oxide was not less than 99.9 percent by weight. After the completion of the introduction of ethylene oxide, an ageing reaction (ring-opening copolymerization) was performed at 130° C. for 1 hour and then a temperature of a system was reverted to normal temperature, thereby obtaining a high-polymer product, i.e., a comparative aliphatic polyester.

The succinic anhydride remaining in the comparative aliphatic polyester was determined by measuring $^1$H-NMR. As a result, the aliphatic polyester has a yield of 99.5 percent, a number-average molecular weight of 14,500 and a melting point of 103.2° C. The results of the measurements of this comparative example are shown in Table 2.

Comparative Example 2

In replace of 179.85 parts of ethylene oxide (available from Nippon Shokubai Col., Ltd. with purity of not less than 99.9 weight percent), 179.85 parts of course ethylene oxide (purity 98.0 weight percent) was used. Other than that, the same reaction as Example 10 was performed in the same manner, and a comparative aliphatic polyester was obtained.

The succinic anhydride remaining in the comparative aliphatic polyester was determined by measuring $^1$H-NMR. As a result, the aliphatic polyester has a yield of 99.8 percent, a number-average molecular weight of 11,000 and a melting point of 102.9° C. The results of the measurements of this comparative example are shown in Table 2.

TABLE 2

|  | Example 10 | Example 11 | Example 12 | Comparative Example 1 | Comparative Example 2 |
|---|---|---|---|---|---|
| purity of succinic anhydride (percent by weight) | 99.8 | 99.8 | 99.5 | 98.8 | 99.8 |
| purity of ethylene oxide (percent by weight) | 99.9 or above | 99.9 or above | 99.9 or above | 99.9 or above | 98.0 |

TABLE 2-continued

|  | Example 10 | Example 11 | Example 12 | Comparative Example 1 | Comparative Example 2 |
|---|---|---|---|---|---|
| number-average molecular weight (Mn) | 37800 | 42300 | 28000 | 14500 | 11000 |
| melting point (°C.) | 101.3 | 104.2 | 94.4 | 103.2 | 102.9 |

EXAMPLE 13

A flask with three openings provided with a thermometer, an agitator, a nitrogen introducing tube and a vigreux column was used as a reaction vessel to perform a primary reaction. The vigreux column was connected to a vacuum pump through a trap. The trap was dipped into a cooling liquid (dry ice methanol).

To the flask with three openings, placed were 120.08 parts of succinic anhydride (polybasic acid anhydride) and 76.63 parts of ethylene glycol (aliphatic glycol). Then, the flask was gradually heated to 185° C. with stirring in a nitrogen current. Next, a polycondensation reaction was performed for 52 hours while maintaining a temperature in the flask with three openings at 185° C. and a vacuum in a range of 1.5 mmHg—normal pressure and distilling water and excessive ethylene glycol generated. Thereafter, a temperature of a system was reverted to normal temperature, thereby obtaining an aliphatic polyester having a number-average molecular weight of 6,000.

Next, a 50 ml separable flask provided with a thermometer, an agitator, a nitrogen introducing tube and a suction tube was prepared as a reaction vessel to perform a secondary reaction. To the separable flask, placed was 10.79 parts of the aliphatic polyester and 0.0004 parts of tetra-n-buthoxyitanium. Then, an inside atmosphere of the autoclave was replaced by a nitrogen gas three times. The suction tube was connected to a vacuum take through a trap. The trap was dipped into a cooling fluid (dry ice-methanol). Next, the mixture in the flask was reacted with stirring at 240° C. and at pressure in the range of 1.0 mmHg to 1.1 mmHg for 5.0 hours, thereby obtaining a high-molecular weight polyester resin composition.

The resulting aliphatic polyester, i.e., a high-molecular aliphatic polyester had a number-average molecular weight of 65,000, a melting point of 104.6° C. and a degree of viscosity at 240.0° C. of 830 poise. The aliphatic polyester had biodegradability. Furthermore, a total amount of a volatile component trapped by a trap and a volatile component adhering on an upper part of the separable flask (hereinafter referred to as a secondary reaction volatile component) was 7.2 percent by weight based on placed aliphatic polyester (10.79 parts). The results of measurements and experiments are shown in Table 3. Throughout the primary reaction and the secondary reaction, such problem that the vacuum line was closed, or the performance of the vacuum pump was lowered, etc., did not arise.

EXAMPLE 14

The same flask with three openings as the flask used in example 13 was used to perform a primary reaction. To the flask with three openings, placed were 200.14 parts of succinic anhydride, 248.28 parts of ethylene glycol and 0.36 parts of tetra-n-buthoxytitanium as a catalyst. The flask was gradually heated to 200° C. with stirring in a nitrogen current. Next, a polycondensation reaction was performed for 17 hours while maintaining a temperature in the flask with three openings at 200° C. and a vacuum in a range of 10.0 mmHg—normal pressure and distilling water and excessive ethylene glycol generated. Thereafter, a temperature of a system was reverted to normal temperature, thereby obtaining an aliphatic polyester having a number-average molecular weight of 5,500.

Next, the same separable flask as the separable flask used in Example 13 was prepared as a reaction vessel to perform a secondary reaction. To the separable flask, placed was 10.10 parts of the aliphatic polyester and 0.0079 parts of tetra-n-butnoxytitanium. Then, an inside atmosphere of the autoclave was replaced by a nitrogen gas three times. Next, the mixture in the flask was reacted with stirring at 240° C. and at pressure in the range of 1.1 mmHg to 1.2 mmHg for 3.5 hours, thereby obtaining a high-molecular aliphatic polyester.

The resulting aliphatic polyester, i.e., a high-molecular aliphatic polyester had a number-average molecular weight of 74,000, a melting point of 104.1° C. and viscosity at 240.0° C. of 1,100 poise. The aliphatic polyester had biodegradability. Furthermore, the secondary reaction volatile component was 9.6 percent by weight based on placed aliphatic polyester (10.10 parts). The results of measurements and experiments are shown in Table 3. Throughout the primary reaction and the secondary reaction, such problem that the vacuum line was closed, or the performance of the vacuum pump was lowered, etc., did not arise.

EXAMPLE 15

An autoclave with three openings provided with a thermometer, an agitator and a nitrogen introducing tube was used as a reaction vessel to perform a primary reaction. To the autoclave with three openings, placed were 100.1 g of succinic anhydride and 2.99 parts of zirconium 2-ethylhexanoate as a catalyst. Then, a temperature of the autoclave was gradually elevated to 130° C. with stirring to dissolve the succinic anhydride. While maintaining a temperature of the autoclave at 130° C. and an inside pressure of the autoclave in a range of 4 0 kgf/cm$^2$ to 8 1 kgf/cm$^2$, 231.26 parts of ethylene oxide (cyclic ether) was successively (gradually) introduced into the autoclave for 5.5 hours at the rate of 42 parts an hour. After the completion Of the introduction of ethylene oxide, an ageing reaction was performed at 130° C. for 1 hour and then a temperature of a system was reverted to normal temperature, thereby obtaining an aliphatic polyester. The resulting aliphatic polyester had a number-average molecular weight of 11,400 and a melting point of 103.1° C.

Next, the same separable flask as the separable flask used in Example 13 was prepared as a reaction vessel to perform a secondary reaction. To the separable flask, placed was 9.67 parts of the aliphatic polyester. Then, an inside atmosphere of the autoclave was replaced by a nitrogen gas three times. Next, the mixture in the flask was reacted with stirring at 240° C. and at pressure in the range of 1.0mmHg to 1.2 mmHg for 3.0 hours, thereby obtaining a high-molecular aliphatic polyester.

The resulting aliphatic polyester, i.e., the high-molecular aliphatic polyester had a number-average molecular weight of 63,400, a melting point of 103.5° C. and a degree of viscosity at 240.0° C. of 820 poise. The aliphatic polyester had biodegradability. The secondary reaction volatile component was 5.9 percent by weight based on placed aliphatic polyester (9.67 parts). The results of measurements and experiments are shown in Table 3. Throughout the primary reaction and the secondary reaction, such problem that the vacuum line was closed, or the performance of the vacuum pump was lowered, etc., did not arise.

EXAMPLE 16

The same primary reaction as Example 15 was performed in the same manner, and an aliphatic polyester was obtained. Next, the same separable flask as the separable flask used in Example 13 was prepared to perform a secondary reaction. To the separable flask, placed was 9.69 parts of the aliphatic polyester. Then, an inside atmosphere of the autoclave was replaced by a nitrogen gas three times. Next, the mixture in the flask was reacted with stirring at 240° C. and at pressure in the range of 2.1 mmHg to 2.2 mmHg for 3.1 hours, thereby obtaining a high-molecular aliphatic polyester.

The resulting aliphatic polyester, i.e., the high-molecular aliphatic polyester had a number-average molecular weight of 57,500, a melting point of 103.5° C. and a degree of viscosity at 240.0° C. of 600 poise. The aliphatic polyester had biodegradability. Furthermore, a total amount of a volatile component trapped by a trap and a volatile component adhering on an upper part of the separable flask (hereinafter referred to as a secondary reaction volatile component) was 5.2 percent by weight based on placed aliphatic polyester (9.69 parts). The results of measurements and experiments are shown in Table 3. Throughout the primary reaction and the secondary reaction, such problem that the vacuum line was closed, or the performance of the vacuum pump was lowered, etc., did not arise.

Comparative Example 3

The same primary reaction as Example 15 was performed in the same manner, and an aliphatic polyester was obtained. Next, the same separable flask as the separable flask used in Example 13 was prepared to perform a secondary reaction. To the separable flask, placed was 10.37 parts of the aliphatic polyester. Then, an inside atmosphere of the autoclave was replaced by a nitrogen gas three times. Next, the mixture in the flask was reacted with stirring at 240° C. and at pressure in the range of 0.09 mmHg to 0.18 mmHg for 3.2 hours, thereby obtaining a high-molecular aliphatic polyester.

The resulting aliphatic polyester, i.e., the high-molecular aliphatic polyester had a number-average molecular weight of 65,300, a melting point of 103.3° C. and a degree of viscosity at 240.0° C. of 825 poise. The aliphtic polyester had biodegradability. Furthermore, a secondary reaction volatile component was 20.9 percent by weight based on placed aliphatic polyester (10.37 parts). The results of measurements and experiments are shown in Table 3.

However, due to a large amount of volatile component generated throughout the reaction, the vacuum was often closed. Thus, the reaction was interrupted many times to take out the volatile component trapped in the trap and to remove the volatile component, etc., stuck in the vacuum line.

TABLE 3

|  | Example 13 | Example 14 | Example 15 | Example 16 | Comparative Example 3 |
|---|---|---|---|---|---|
| primary reaction |  |  |  |  |  |
| pressure | 1.5 mmHg-normal pressure | 10.0 mmHg-normal pressure | 4.0–8.1 kgf/cm$^2$ | 4.0–8.1 kgf/cm$^2$ | 4.0–8.1 kgf/cm$^2$ |
| number-average molecular weight (Mn) | 6000 | 5500 | 11400 | 11400 | 11400 |
| secondary reaction |  |  |  |  |  |
| vaccuum (mmHg) | above 1.0–1.1 | 1.1–1.2 | above 1.0–1.2 | 2.1–2.2 | 0.09–0.18 |
| reaction temperature (°C.) | 240 | 240 | 240 | 240 | 240 |
| secondary reaction volatile component (% by weight) | 7.2 | 9.6 | 5.9 | 5.2 | 20.9 |
| number average molecular weight (Mn) | 65000 | 74000 | 63400 | 57500 | 65300 |
| melting point (°C.) | 104.6 | 104.1 | 103.5 | 103.5 | 103.3 |
| viscosity (poise) | 830 | 1100 | 820 | 600 | 825 |
| biodegradability | (+) | (+) | (+) | (+) | (+) |

EXAMPLE 17

An autoclave provided with a thermometer, an agitator and a nitrogen introducing tube was used as a reaction vessel to perform a primary reaction. To the autoclave, placed were 500.0 parts of succinic anhydride and 3.68 parts of zirconium 2-ethylhexanoate. An inside atmosphere of the autoclave was replaced by a nitrogen gas. Then, a temperature of the autoclave was gradually elevated to 130° C. with stirring to dissolve the succinic anhydride. While maintaining a temperature of the autoclave an 130° C. and an inside pressure of the autoclave in a range of 4.0 kgf/cm$^2$ to 6.5 kgf/cm$^2$, 231.1 parts of ethylene oxide (cyclic ether) was successively (gradually) introduced into the autoclave for 4.0 hours at the rate of 58 parts an hour. After the completion of the introduction of ethylene oxide, an ageing reaction was performed at 130° C. for 1 hour and then a temperature of a system was reverted to normal temperature, thereby obtaining an aliphatic polyester. The resulting aliphatic polyester has a number-average molecular weight of 36,000, and a melting point of 103.4° C.

Next, a 50 ml separable flask provided with a thermometer, an agitator, a nitrogen introducing tube and a suction tube was prepared as a reaction vessel to perform a secondary reaction. To the separable flask, placed was 12.0 parts of the aliphatic polyester. Then, an inside atmosphere of the autoclave was replaced by a nitrogen gas three times. The suction tube was connected to a vacuum tube through a trap. The trap was dipped into a cooling fluid (dryice-methanol). Next, the mixture in the flask was subjected to ester-exchange reaction with stirring at 240° C. and at pressure in the range of 0.9 mmHg to 1.1 mmHg for 1.5 hours, thereby obtaining a high-molecular aliphatic polyester. The total time required for this reaction was 6.5 hours.

The resulting aliphatic polyester, i.e., a high-molecular aliphatic polyester had a number-average molecular weight of 68,000, a melting point of 103.2° C. and a degree of viscosity at 240.0° C. of 930 poise. The aliphatic polyester had biodegradability. Furthermore, a secondary reaction volatile component was 0.48 parts. The total amount of the volatile components (primary reaction and secondary reaction) was 4.0 percent by weight with respect to the placed materials (500.0 parts of succinic anhydride and 231.1 parts of ethylene oxide). The results of measurements and experimental results are shown in Table 4. Throughout the primary reaction and the secondary reaction, such problem that the vacuum line was closed, or the performance of the vacuum pump was lowered, etc., did not arise.

EXAMPLE 18

In replace of 3.68 parts of zirconium 2-ethylhexanoate in Example 17, 3.70 parts of tetra-t-buthoryzirconium was used as a catalyst. Other than that, the same primary reaction and the secondary reaction as Example 17 were performed in the same manner, and an aliphatic polyester was obtained.

The resulting aliphatic polyester, i.e., a high-molecular aliphatic polyester had a huntbar-average molecular weight of 65,000, a melting point of 103.5° C. and a degree of viscosity at 240.0° C. of 830 poise. The aliphatic polyester had biodegradability. Furthermore, a secondary reaction volatile component was 0.60 parts. The total amount of the volatile components (primary reaction and secondary reaction) was 5.0 percent by weight. The results of measurements and experimental results are shown in Table 4. Throughout the primary reaction and the secondary reaction, such problem that the vacuum line was closed, or the performance of the vacuum pump was lowered, etc., did not arise.

EXAMPLE 19

The same autoclave as the autoclave used in Example 17 was used to perform a primary reaction. To the autoclave, placed were 500.0 parts of succinic anhydride and 3.68 parts of zirconium 2-ethylhexanoate. An inside atmosphere of the autoclave was replaced by a nitrogen gas. In this example, a commercially available succinic anhydride was used.

Then, a temperature of the autoclave was gradually elevated to 130° C. with stirring to dissolve the succinic anhydride. While maintaining a temperature of the autoclave at 130° C. and an inside pressure of the autoclave in a range of 4.0 kgf/cm$^2$ to 8.5 kgf/cm$^2$, 231.1 parts of ethylene oxide was successively (gradually) introduced into the autoclave for 4.0 hours at the rate of 58 parts an hour. After the completion of the introduction of ethylene oxide, an ageing reaction was performed at 130° C. for 1.0 hour and then a temperature of a system was reverted to normal temperature, thereby obtaining an aliphatic polyester. The resulting aliphatic polyester has a number-average molecular weight of 13,000, and a melting point of 104.4° C.

Next, the same separable flask as the separable flask used in Example 17 was used to perform a secondary reaction. To the separable flask, placed was 12.0 parts of the aliphatic polyester. Then, an inside atmosphere of the autoclave was replaced by a nitrogen gas three times. The suction tube was connected to a vacuum tube through a trap. The trap was dipped into a cooling fluid (dry ice-methanol). Next, the mixture in the flask was reacted with stirring at 240° C. and at pressure in the range of 0.5 mmHg to 0.6 mmHg for 3.0 hours, thereby obtaining a high-molecular aliphatic polyester. The total time required for this reaction was 8.0 hours.

The resulting aliphatic polyester, i.e., a high-molecular aliphatic polyester had a number-average molecular weight of 62,000, a melting point of 101.9° C. and a degree of viscosity at 240.0° C. of 760 poise. The aliphatic polyester had biodegradability. Furthermore, a secondary reaction volatile component was 1.92 parts. The total amount of the volatile components (primary reaction and secondary reaction) was 16.0 percent by weight with respect to the placed material. The results of measurements and experimental results are shown in Table 4. Throughout the primary reaction and the secondary reaction, such problem that the vacuum line was closed, or the performance of the vacuum pump was lowered, etc., did not arise.

EXAMPLE 20

The same primary reaction as Example 19 was performed in the same manner, and an aliphatic polyester was obtained. Next, the same separable flask as the separable flask used in Example 17 was prepared to perform a secondary reaction. To the separable flask, placed was 12.0 parts of the aliphatic polyester. Then, an inside atmosphere of the autoclave was replaced by a nitrogen gas three times. Next, the mixture in the flask was reacted with stirring at 240° C. and at pressure in the range of 0.3 mmHg to 0.4 mmHg for 3.0 hours, thereby obtaining a high-molecular aliphatic polyester. The total time required for this reaction was 8.0 hours.

The resulting aliphatic polyester, i.e., the high-molecular aliphatic polyester had a number-average molecular weight of 65,000, a melting point of 102.8° C. and a degree of viscosity at 240.0° C. of 840 poise. Thel aliphatic polyester had biodegradability. Furthermore, a secondary reaction volatile component was 2.61 parts. The total amount of volatile component was 21.8 percent by weight based on placed material. The results of measurements and experiments are shown in Table 4. Throughout the primary reaction and the secondary reaction, such problem that the vacuum line was closed, or the performance of the vacuum pump was lowered, etc., did not arise.

Comparative Example 4

A flask with three openings provided with a thermometer, an agitator, a nitrogen introducing tube and a vigreux column was used as a reaction vessel to perform a primary reaction. The vigreux column was connected to a vacuum pump through a trap. The trap was dipped into a cooling liquid (dry ice methanol).

To the flask with three openings, placed were 47.2 parts of succinic acid, 46.9 parts of tetramethylene glycol and 0.026 parts of magnesium acetate terahydrate. The flask with three openings was dipped into an oil bath. The flask was gradually heated to 200° C. with stirring in a nitrogen current. Next, a polycondensation reaction was performed for 3 hours while maintaining a temperature in the flask with three openings at 200° C. and a vacuum in a range of 1.5 mmHg—normal pressure and distilling generated water and excessive amount of tetramethylene glycol, thereby obtaining an oligomer.

Then, 0.14 parts of tetra-n-buthoxymethane was added to the resulting oligomer. Next, an ester exchange reaction was performed in a nitrogen gas current for 2 hours while maintaining a temperature at 220° C. and a vacuum of 2.0 mmHg. Then, a further ester exchange reaction was performed at temperature 240° C. and a vacuum in a range of 0.1 mmHg—0.2 mmHg for 1 hour, thereby obtaining a comparative aliphatic polyester. The total time required for this reaction was 6.0 hours.

The resulting comparative aliphatic polyester had a number-average molecular weight of 48,000, a melting point of 115.0° C. and a degree of viscosity at 240.0° C. of 1,100 poise. This comparative aliphatic polyester had not biodegradability. Furthermore, a secondary reachion volatile component was 26.4 parts. The total amount off volatile component was 28.0 percent by weight based on the placed material. The results of measurements and experiments are shown in Table 4. The comparative aliphatic polyester was dissolved in chloroform so as to have a density of 5 g/L. Then, a degree of viscosity of the comparative aliphatic polyester at 30° C. was measured, and the viscosity of the solvent was determined to be 0.95 poise.

However, due to a large amount of volatile component generated throughout the reaction, the vacuum was often closed. Thus, the reaction was interrupted many times to take out the volatile component trapped in the trap and to remove the volatile component, etc., stuck in the vacuum line.

Comparative Example 5

Next, a 70L reaction vessel provided with a thermometer, an agitator, a nitrogen introducing tube and a suction tube was prepared. The suction tube was connected to a general vacuum pump and to a high performance vacuum pump through a trap. The trap was dipped in a cooling fluid (dry ice—methanol). Between the trap and the vacuum pumps, placed was a switching cock so as to be switched to a vacuum pump, i.e., a vacuum line to be used. Then, after replacing an inside atmosphere of the autoclave by a nitrogen gas, 22.4 kg of succinic acid and 18.3 kg of 1,4-buthanediol. Next, an ester exchange reaction was performed in a nitrogen gas current for 3.5 hours while maintaining a temperature in a range of 192° C. to 220° C. and at normal pressure. Thereafter, using the normal vacuum pump, an introduction of nitrogen was stopped. Then, a further esterification reaction (dehydrizing condensation) was performed at temperature in a range of 92° C. to 220° C. and at a vacuum in a range of 2 mmHg—20 mmHg for 3.5 hours.

Then, after setting the reaction system at normal pressure by introducing nitrogen, 3.4 g of tetra-iso-propoxytitanium was added to the reaction system. Next, a deglycol reaction was performed with stirring under a nitrogen current under conditions of temperature 215° C.–220° C., vacuum 0.2 mmHg–15 mmHg for 4.5 hours. After the completion of the diglycol reaction, the temperature in the reaction was set in the range of 215° C.–220° C. and the vacuum was set at 0.2 mmHg.

In this slate, a vacuum line was switched to the high performance vacuum pump. Then, a deglycol reaction was performed at temperature in a range of 215°–220° C., a vacuum of 0.02 mmHg for 4.0 hours, thereby obtaining a comparative aliphatic polyester. The total time required for this reaction was 15.5 hours.

The resulting comparative aliphatic polyester had a number-average molecular weight of 35,000, a melting point of 110.0° C. and a degree of viscosity at 220.0° C. of 820 poise. This comparative aliphatic polyester had not biodegradability. Furthermore, a secondary reaction volatile component was 10.8 Kg. The total amount of volatile component was 26.5 percent by weight based on the placed material. The results of measurements and experiments are shown in Table 4. However, due to a large amount of volatile component generated throughout the reaction, the vacuum was often closed. Thus, the reaction was interrupted many times to take out the volatile component trapped in the trap and to remove the volatile component, etc., stuck in the vacuum line.

TABLE 4

|  | Example 17 | Example 18 | Example 19 | Example 20 |
|---|---|---|---|---|
| number-average molecular weight (Mn) | 68000 | 65000 | 62000 | 65000 |
| decompression (mmHg) | 0.9–1.1 | 0.9–1.1 | 0.5–0.6 | 0.3–0.4 |
| reaction temperature (°C.) | 240 | 240 | 240 | 240 |
| total reaction time (hr) | 6.5 | 6.5 | 8.0 | 8.0 |
| volatile component (% by weight) | 4.0 | 5.0 | 16.0 | 21.8 |
| melting point (°C.) | 103.2 | 103.5 | 101.9 | 102.8 |
| viscosity (poise) | 930 | 830 | 760 | 840 |
| biodogradability | (+) | (+) | (+) | (+) |

|  | Comparative Example 4 | Comparative Example 5 |
|---|---|---|
| number-average molecular weight (Mn) | 48000 | 35000 |
| decompression (mmHg) | 0.1–2.0 | 0.02 . 15 |
| reaction temperature | 220–240 | 215–220 |
| total reaction time (hr) | 6.0 | 15.5 |
| volatile component (% by weight) | 28.0 | 26.5 |
| melting point (°C.) | 113.0 | 110.0 |
| viscosity (poise) | 1100 | 820 |
| biodegradability | (−) | (−) |

The invention being thus described, it will be obvious that the same way be varied in many ways. Such variations are not to be regarded as a departure from the spirit and scope of the invention, and all such modifications as would be obvious to one skilled in the art are intended to be included within the scope of the following claims.

What is claimed is:

1. A process for producing an aliphatic polyester, comprising the step of:

carrying out a ring-opening polymerization of a cyclic acid anhydride with a cyclic ether in a presence of at least one zirconium compound selected from the group consisting of zirconium 2-ethylhexanoate, zirconium carbonate hydroxide oxide and zirconium hydroxide.

2. The process as set forth in claim 1, wherein:

said zirconium compound is an alkoxyzirconium and/or oxyzirconium salt.

3. The process as set forth in claim 1, wherein:

said zirconium compound compound is zirconium 2-ethylhexanoate.

4. The process as set forth in claim 1, wherein:

said zirconium compound is used in an amount in a range of 0.001 percent by weight to 10 percent by weight based on a total amount of the cyclic acid anhydride and the cyclic ether.

5. The process as set forth in claim 1, wherein:

a mole ration of said cyclic acid anhydride to said cyclic ether (cyclic acid anhydride/cyclic ether) is in a range of 40/60 to 60/40.

6. The process as set forth in claim 1, wherein:

said cyclic acid anhydride includes at least one acid anhydride group in a molecule.

7. The process as set forth in claim 1, wherein:

said cyclic acid anhydride includes succinic anhydride.

8. The process as set forth in claim 1, wherein:

said cyclic ether includes one epoxy group in a molecule.

9. The process as set forth in claim 1, wherein:

said cyclic ether includes ethylene oxide.

10. The process as set forth in claim 1, wherein:

said step of carrying out the ring-opening polymerization includes a step of gradually introducing a cyclic ether into a reaction system.

11. The process as set forth in claim 1, wherein:

said step of carrying out a ring-opening polymerization includes a step of gradually introducing the cyclic ether at a rate of 3 parts by weight to 90 parts by weight per hour based on 100 parts by weight of the cyclic acid anhydride.

12. The process as set forth in claim 1, wherein:

said step of carrying out the ring-opening polymerization reaction includes a step of gradually introducing the zirconium compound into the reaction system.

13. The process as set forth in claim 1, wherein:

the ring-opening polymerization reaction is performed in a presence of a solvent.

14. The process as set forth in claim 1, wherein:

said ring-opening polymerization reaction is performed at temperature in a range of 10° C. to 250° C.

15. The process as set forth in claim 1, wherein:

said ring-opening polymerization is performed at pressure in a range of normal pressure to 50 kgf/cm$^2$.

16. The process as set forth in claim 1, wherein:

a resulting aliphatic polyester has a number-average molecular weight in a range of 10,000 to 100,000.

17. The process as set forth in claim 1, further comprising the step of:

carrying cut a reaction with a crosslinking agent after said ring-opening polymerization reaction.

18. A process for producing an aliphatic polyester, comprising the step of:

carrying out a ring-opening polymerization reaction of a cyclic acid anhydride with purity of not less than 99.0 percent with a cyclic ether with purity of not less than 99.0 percent.

19. The process as set forth in claim 18, wherein:

said ring-opening polymerization reaction is performed in a presence of a catalyst.

20. The process as set forth in claim 19, wherein:
the catalyst is used in an amount in a range of 0.001 percent by weight to 10 percent by weight based on a total amount of said cyclic acid anhydride and said cyclic ether.

21. The process as set forth in claim 19, wherein:
the catalyst is at least one kind selected from the group consisting of zironium 2-ethylhexanoate, tetraalkoxyzirconium and trialkoxyaluminum.

22. The precess as set forth in claim 18, wherein:
a mole ration of said cyclic acid anhydride to said cyclic ether (cyclic acid anhydride/cyclic ether) is in a range of 40/60–60/40.

23. The process as set forth in claim 18, wherein:
said cyclic acid anhydride includes at least one acid anhydride group In a molecule.

24. The process as set forth in claim 18, wherein:
said cyclic acid anhydride includes succinic anhydride.

25. The process as set forth in claim 18, wherein:
said cyclic ether has an epoxy group in a molecule.

26. The process as set forth in claim 18, wherein: said cyclic ether includes ethylene oxide.

27. The process as set forth in claim 18, wherein:
said step of carrying out the ring-opening polymerization reaction includes a step of gradually introducing the cyclic ether into a reaction system.

28. The process as set forth in claim 18, wherein:
said step of carrying out the ring-opening polymerization includes a step of gradually introducing the cyclic ether at a range of 3 parts by weight—90 parts by weight per hour based on 100 parts by weight of the cyclic acid anhydride.

29. The process as set forth in claim 18, wherein:
said step of carrying out said ring-opening polymerization reaction includes the step of gradually introducing the catalyst into the reaction system.

30. The process as set forth in claim 18, wherein:
said ring-opening polymerization reaction is carried out in a presence of a solvent.

31. The process as set forth in claim 18, wherein:
said ring-opening polymerization reaction is performed at temperature in a range of 10° C. to 250° C.

32. The process as set forth in claim 18, wherein:
said ring-opening polymerization is performed at pressure in a range of normal pressure to 50 kgf/cm$^2$.

33. The process as set forth in claim 18, wherein:
a resulting aliphatic polyester has a number-average molecular weight in a range of 20,000 to 100,000.

34. The process as set forth in claim 18, further comprising the step of:
carrying out a reaction with a crosslinking agent after said ring-opening polymerization reaction.

35. A process for producing an aliphatic polyester, comprising the step of:
after subjecting a raw material of said aliphatic polyester for 0.1–30 hours under conditions of reaction temperature of 180°–280° C. and a reaction pressure of 0.3 mmHg–3.0 mmHg, stirring the raw material to produce a reaction system having a viscosity in a range of 10 poise to 100,000 poise at said reaction temperature.

36. The process as set forth in claim 35, wherein:
said viscosity is in a range of 100 poise to 50,000 poise.

37. The process as set forth in claim 35, wherein:
said viscosity of the reaction system is in a range of 10 to 100,000 poise after 0.5–10 hours have passed.

38. The process as set forth in claim 37, wherein:
said viscosity of the reaction system is in a range of 100 poise to 50,000 poise.

39. The process as set forth in claim 35, wherein:
said reaction is a ring-opening polymerization reaction performed at temperature in a range of 235° C. to 280° C.

40. The process as set forth in claim 39, wherein:
said ring-opening polymerization is performed at reaction pressure in a range of 0.5 mmHg to 1.5 mmHg.

41. The process as set forth in claim 40, wherein:
said ring-opening polymerization is performed at reaction pressure in a range of 1.0 mmHg to 1.5 mmHg.

42. The process as set forth in claim 40, wherein:
said polymerization pressure is carried out in a presence of a catalyst.

43. The process as set forth in claim 40, wherein:
said raw material is composed of an aliphatic dicarboxylic acid and an aliphatic glycol.

44. The process as set forth in claim 35, wherein:
said raw material is composed of an aliphatic dicarboxylic acid having 2–6 carbon atoms and an aliphatic glycol having 2–4 carbon atoms.

45. The process as set forth in claim 35, wherein:
said aliphatic polyester is formed by a polycondensation reaction of succinic acid, and ethylene glycol and/or 1,4-butandiaol.

46. The process of aliphatic polyester as set forth in claim 35, wherein:
said raw material is composed of an aliphatic hydroxy carboxylic acid.

47. The process of aliphatic polyester as set forth in claim 35, wherein:
said step of carrying out the polymerization reaction includes a step of gradually introducing a raw material to the reaction system.

48. The process of aliphatic polyester as set forth in claim 36, wherein:
a content of a volatile component generated by polymerization is not more than 25 percent by weight of said raw material.

49. The process of aliphatic polyester as set forth in claim 35, wherein:
a content of a volatile component generated by polymerization is not more than 20 percent by weight of said raw material.

50. The process of aliphatic polyester as set forth in claim 35, wherein:
a content of a volatile component generated by polymerization is not more than 10 percent by weight of said raw material.

51. The process as set forth in claim 35, wherein:
a resulting aliphatic polyester has a number-average molecular weight in a range of 10,000 to 100,000.

52. The process as set forth in claim 35, further comprising the step of:
carrying out a reaction with a crosslinking agent after the step of carrying out said ring-opening polymerization reaction.

53. A process for producing an aliphatic polyester, comprising the steps of:
carrying out a ring-opening polymerization reaction of a cyclic acid anhydride with a cyclic ether and/or a cyclic ester in a presence of a catalyst; and after subjecting a raw material of said aliphatic polyester for 0.1 hours–30 hours under conditions of reaction temperature of 180° C.–280° C. and a reaction pressure of 0.3 mmHg–3.0 mmHg, carrying out a polycondensation reaction with stirring the raw material to produce a reaction system having a viscosity in a range of 10 poise to 100,000 poise at said reaction temperature.

54. The method as set forth in claim 53, wherein:

the catalyst used in the step of carrying out the ring-opening polymerization reaction is a zirconium compound.

55. The method as set forth in claim 53, wherein:

said zirconium compound is at least one kind selecting from a group consisting of a zirconium 2-ethylhexanoate, zirconiumcarbonate hydroxide oxide and zirconium hydroxide.

56. The process as set forth in claim 53, wherein:

in said ring-opening polymerization method, the catalyst is used in an amount in a range of 0.001 percent by weight to 10 percent by weight based on a total amount of said cyclic acid anhydride, said cyclic ether, and or cyclic ester.

57. The process as set forth in claim 53, wherein:

mole ration of said cyclic acid anhydride to said cyclic ether (cyclic acid anhydride/cyclic ether) is in a range of 40/60 to 60/40.

58. The process as set forth in claim 53, wherein:

said cyclic acid anhydride includes one acid anhydride group in a molecule.

59. The process as set forth in claim 53, wherein:

said cyclic acid anhydride includes succinic anhydride.

60. The process as set forth in claim 53, wherein:

said cyclic ether has an epoxy group in a molecule.

61. The process as set forth in claim 53, wherein:

said cyclic ether includes ethylene oxide.

62. The process as set forth in claim 53, wherein:

said step of carrying out the ring-opening polymerization reaction includes a step of gradually introducing the cyclic ether into a reaction system.

63. The process as set forth in claim 53, wherein:

said step of carrying out the ring-opening polymerization includes a step of gradually introducing the cyclic ether at a range of 3 parts by weight—90 parts by weight per hour based on 100 parts by weight of the cyclic acid anhydride.

64. The process as set forth in claim 53, wherein:

said step of carrying out said ring-opening polymerization reaction includes the step of gradually introducing the catalyst into the reaction system.

65. The process as set forth in claim 53, wherein:

the ring-opening polymerization is performed in presence of a solvent.

66. The process as set forth in claim 53, wherein:

said ring-opening polymerization reaction is performed at temperature in a range of 10° C. to 250° C.

67. The process as set forth in claim 53, wherein:

said ring-opening polymerization is performed at pressure in a range of normal pressure to 50 kgf/cm$^2$.

68. The process as set forth in claim 53, wherein:

said viscosity is in a range of 100 poise to 50,000 poise.

69. The process as set forth in claim 53, wherein:

said viscosity of the reaction system is in a range of 10 to 100,000 poise after 0.5–10 hours have passed.

70. The process as set forth in claim 69, wherein:

said viscosity of the reaction system is in a range of 100 poise to 50,000 poise.

71. The process as set forth in claim 53, wherein:

said ring-opening polymerization reaction is performed at temperature in a range of 235° C. to 280° C.

72. The process as set forth in claim 53, wherein:

said ring-opening polymerization is performed at reaction pressure in a range of 0.5 mmHg to 1.5 mmHg.

73. The process as set forth in claim 53, wherein:

said ring-opening polymerization is performed at reaction pressure in a range of 1.0 mmHg to 1.5 mmHg.

74. The process as set forth in claim 53, wherein:

said polymerization pressure is carried out in a presence of a catalyst.

75. The process of aliphatic polyester as set forth in claim 53, wherein:

a content of a volatile component generated by polymerization is not more than 25 percent by weight of said raw material.

76. The process of aliphatic polyester as set forth in claim 53, wherein, a content of a volatile component generated by polymerization is not more than 20 percent by weight of said raw material.

77. The process of aliphatic polyester as set forth in claim 53, wherein:

a content of a volatile component generated by polymerization is not more than 10 percent by weight of said raw material.

78. The process as set forth in claim 53, wherein:

a resulting aliphatic polyester has a number-average molecular weight in a range of 10,000 to 100,000.

79. The process as set forth in claim 53, further comprising the step of:

carrying out a reaction with a crosslinking agent after said ring-opening polymerization reaction.

* * * * *